United States Patent [19]
Banks et al.

[11] Patent Number: 6,036,802
[45] Date of Patent: *Mar. 14, 2000

[54] THERMOPLASTIC PANEL BENDING

[75] Inventors: David P. Banks, Lake Stevens; Ronald M. Olive; Richard G. Struve, both of Seattle; Howard J. Van Laeken, Woodinville; Rinhold E. Wilde, Arlington, all of Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,987

[22] Filed: Sep. 13, 1996

[51] Int. Cl.⁷ ...................................................... B32B 9/00
[52] U.S. Cl. ............................................................. 156/197
[58] Field of Search ................................... 428/116, 118; 156/197

[56] References Cited

U.S. PATENT DOCUMENTS

| | | | |
|---|---|---|---|
| 2,704,587 | 3/1955 | Pajak | 428/118 |
| 3,888,613 | 6/1975 | Fries et al. | 425/384 X |
| 3,890,108 | 6/1975 | Welsh | 428/116 X |
| 4,034,205 | 7/1977 | Reichel | 425/384 X |
| 4,359,314 | 11/1982 | Hellmer | 425/503 |
| 4,389,179 | 6/1983 | Westcott et al. | 425/384 X |
| 4,462,786 | 7/1984 | Perryman | 425/388 |
| 4,465,453 | 8/1984 | Turner et al. | 425/384 |
| 4,500,380 | 2/1985 | Bova | 156/197 |
| 4,548,665 | 10/1985 | Morin | 156/197 |
| 4,571,320 | 2/1986 | Walker | 264/40.1 |
| 4,917,747 | 4/1990 | Chin et al. | 428/116 X |
| 4,976,603 | 12/1990 | Disimone | 425/556 |
| 5,052,913 | 10/1991 | Conliffe | 264/339 X |
| 5,098,632 | 3/1992 | Conliffe | 264/339 |
| 5,326,249 | 7/1994 | Weissfloch | 425/383 |
| 5,354,394 | 10/1994 | Seebo et al. | 428/118 X |

FOREIGN PATENT DOCUMENTS 2168643  6/1986  United Kingdom .

OTHER PUBLICATIONS

Van Dreumel W H M et al. "Origami–Technology Creative Manufacaturing of Advance Composite Parts" Composite Polymers, vol. 3, No. 1, Jan. 1, 1990, pp. 42–43.

Primary Examiner—Timothy M. Speer
Attorney, Agent, or Firm—J. Michael Neary

[57] ABSTRACT

A process for bending a thermoplastic skinned honeycomb core panel includes clamping a planar portion of the panel between upper and lower platens to hold the panel against movement parallel to the plane of the planar portion. A linear band of a face sheet on one side of the panel is heated with a heater bar to soften resin in the face sheet and disbond adhesive holding the face sheet to the honeycomb core. The heater bar is lifted away from the face sheet, forming the linear band into a bubble separated away from the honeycomb core. A distal leg of the panel, outboard of the clamped portion, is bent around a heated anvil along an axis parallel to the linear band to form a bend having an inside radius, with the bubble coinciding with the inside radius. The bubble collapses around the inside radius and forms an overlapping flap of face sheet material. The overlapping flap of face sheet material is pressed in a fold between the anvil and the bent leg of the panel, and the leg is held in the bent position while resin in the flap freezes in the fold.

39 Claims, 20 Drawing Sheets

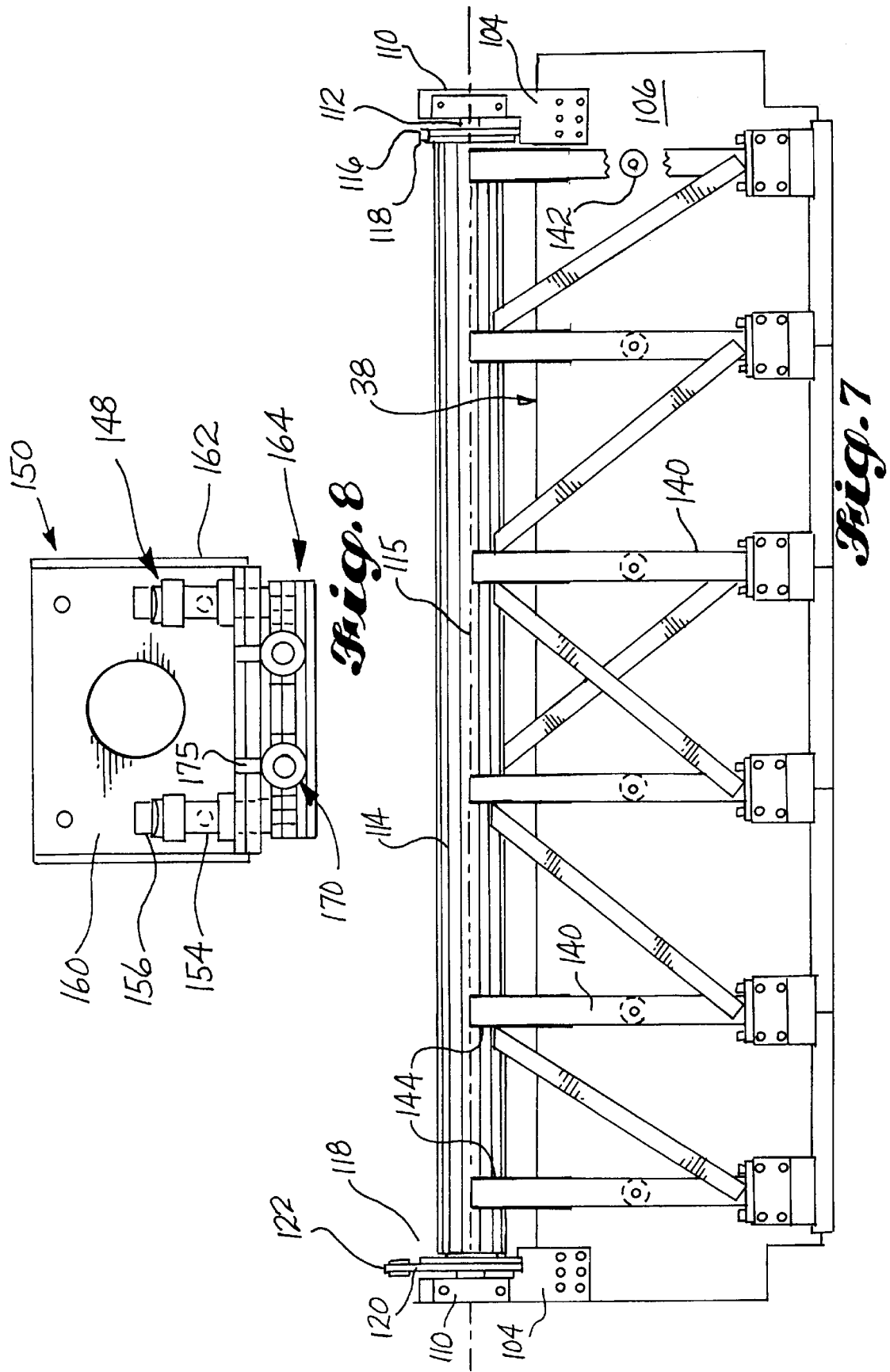

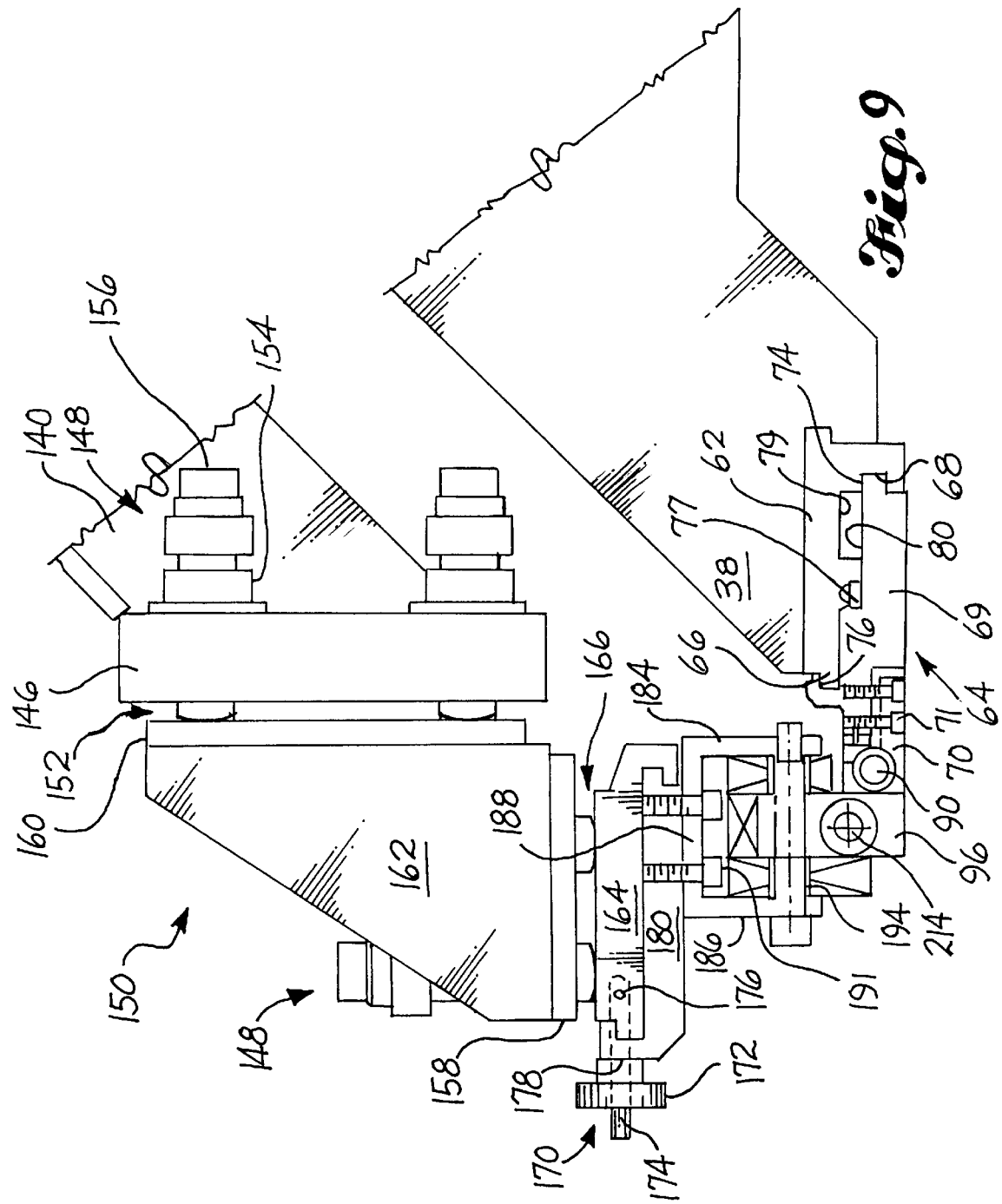

Fig. 10

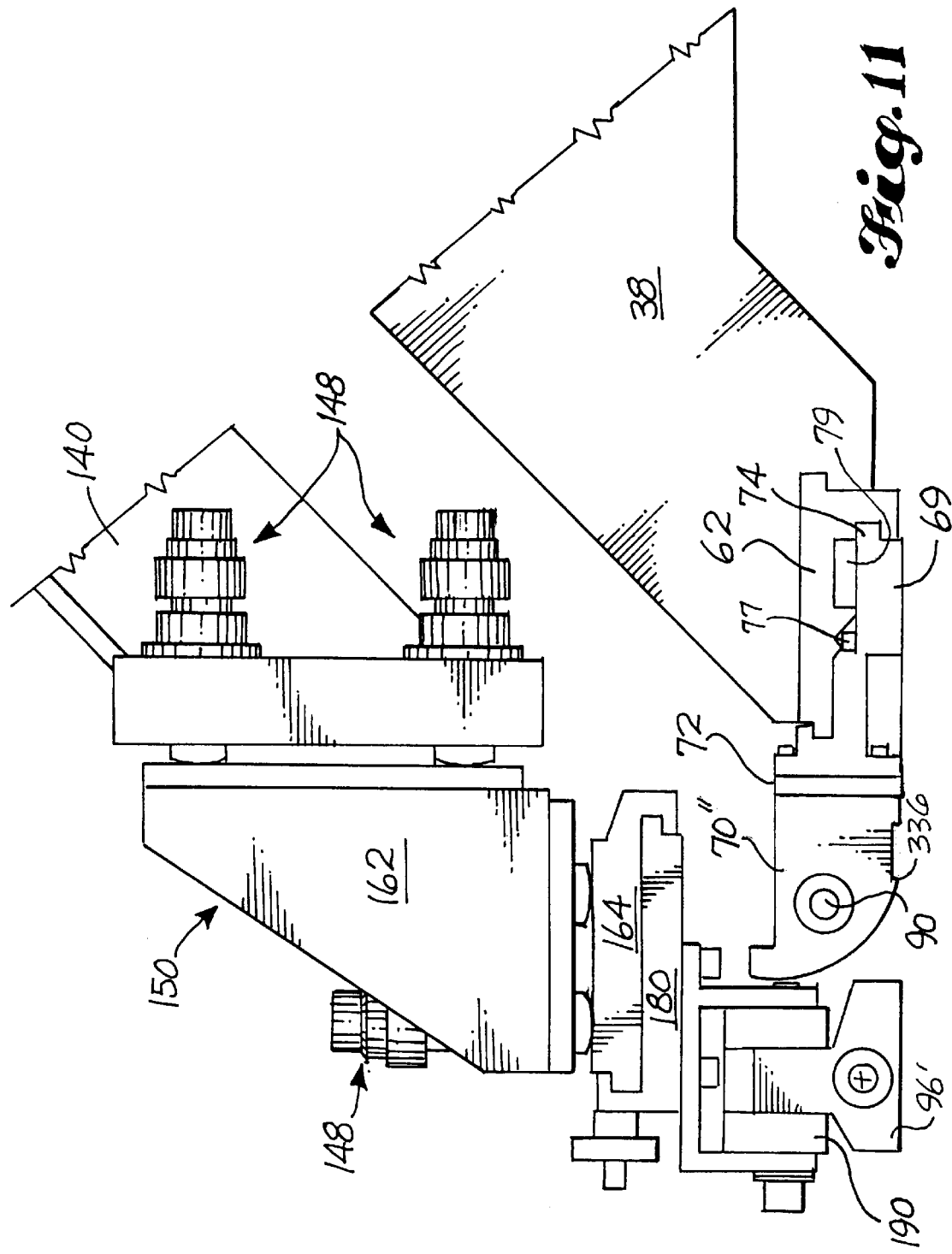

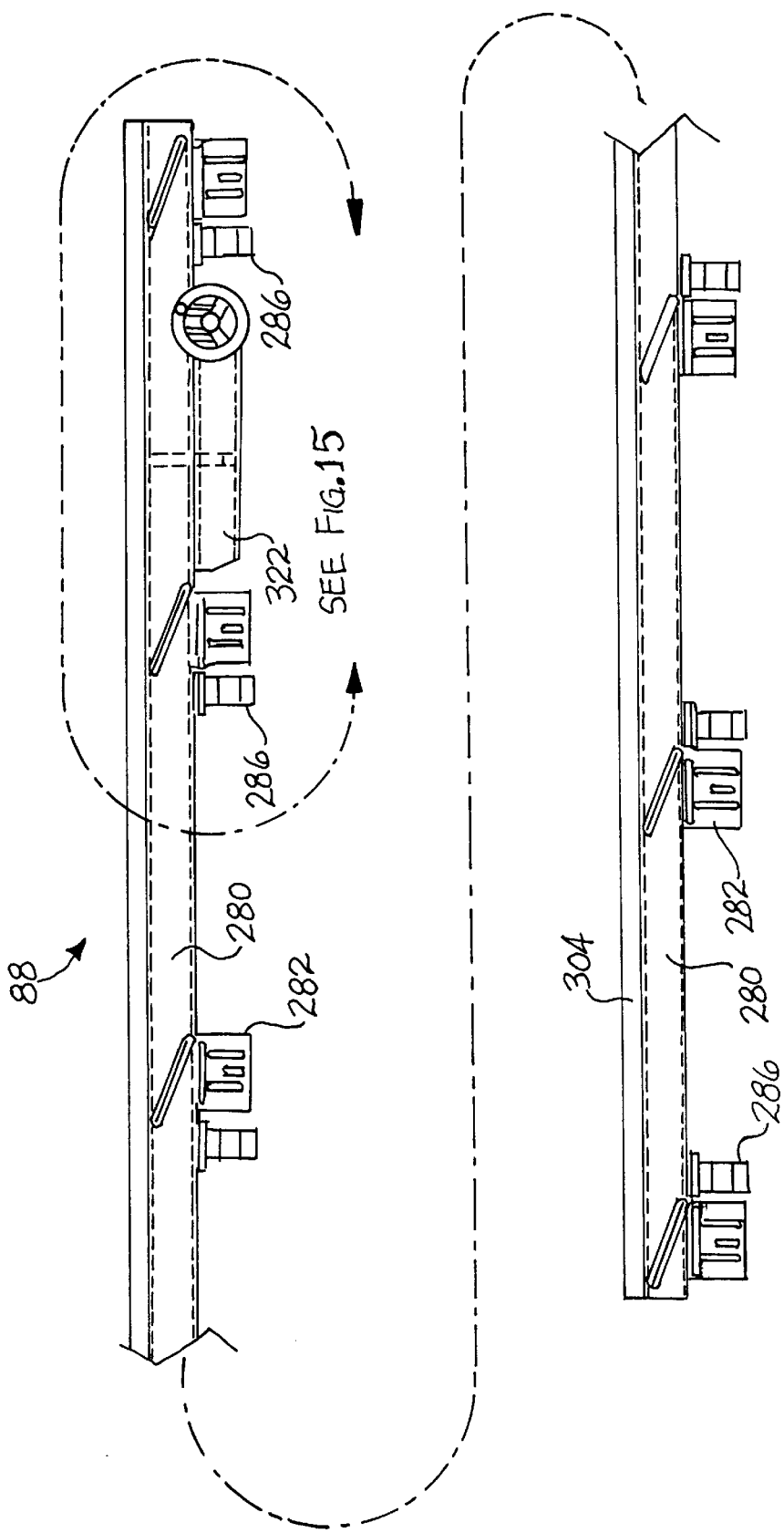

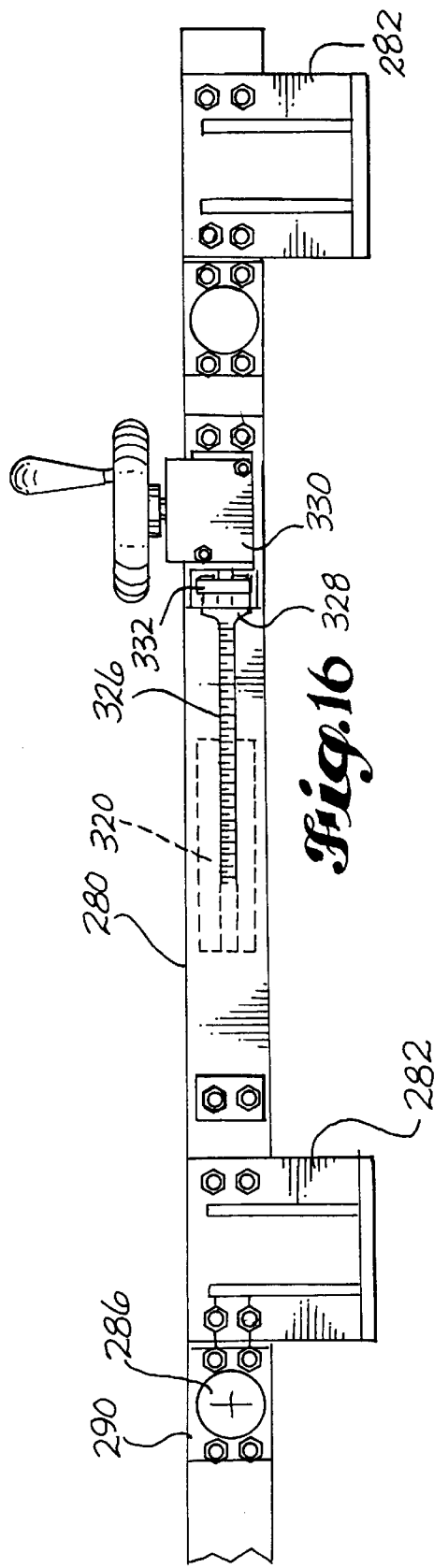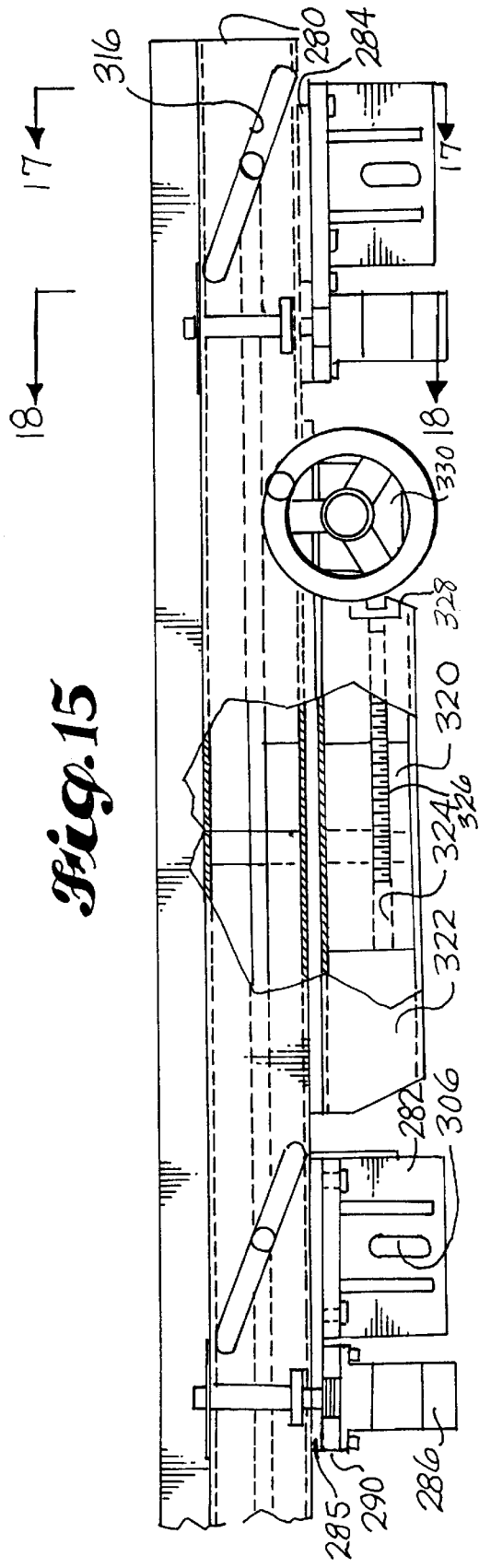

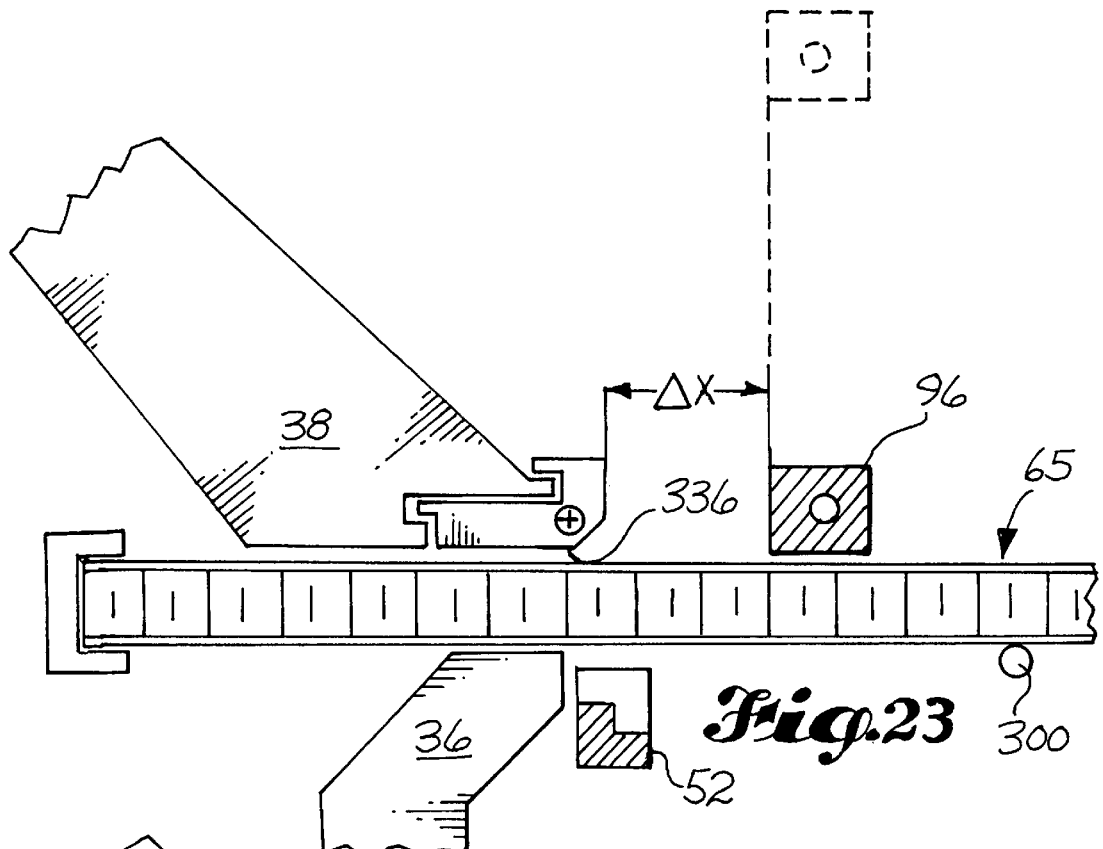
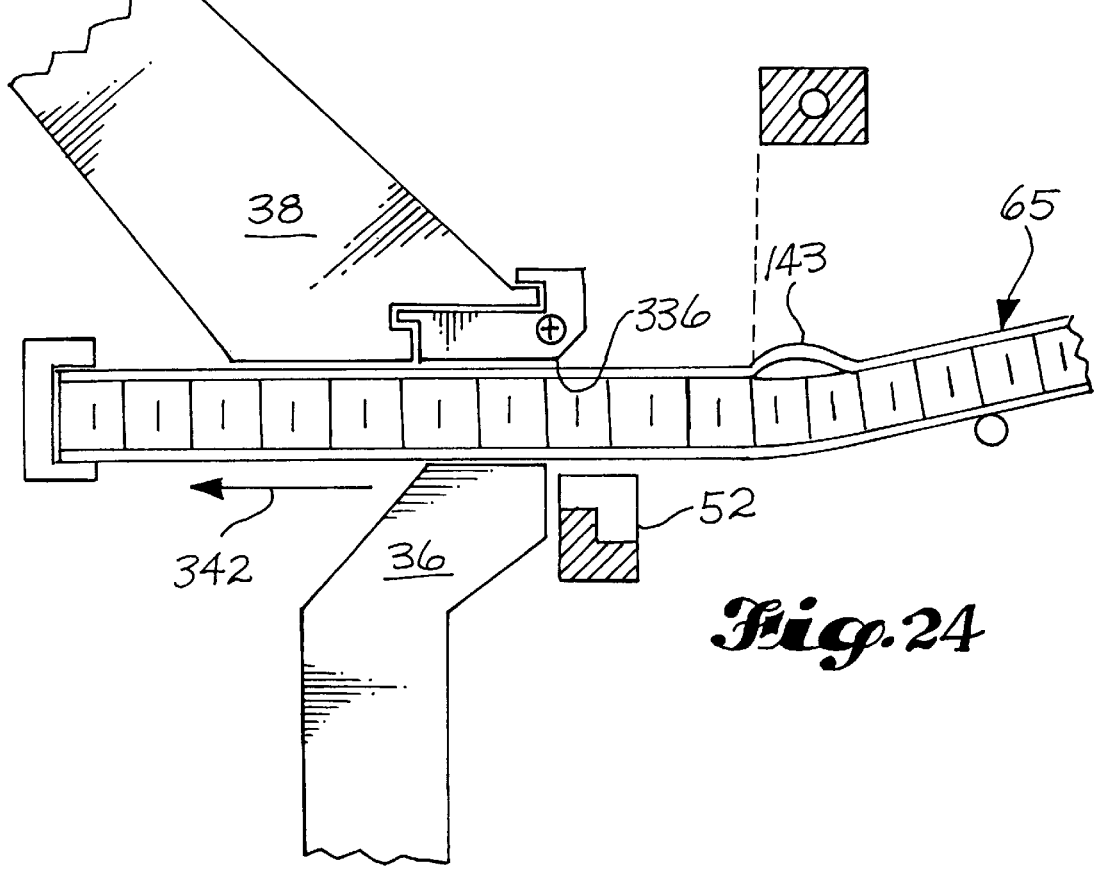

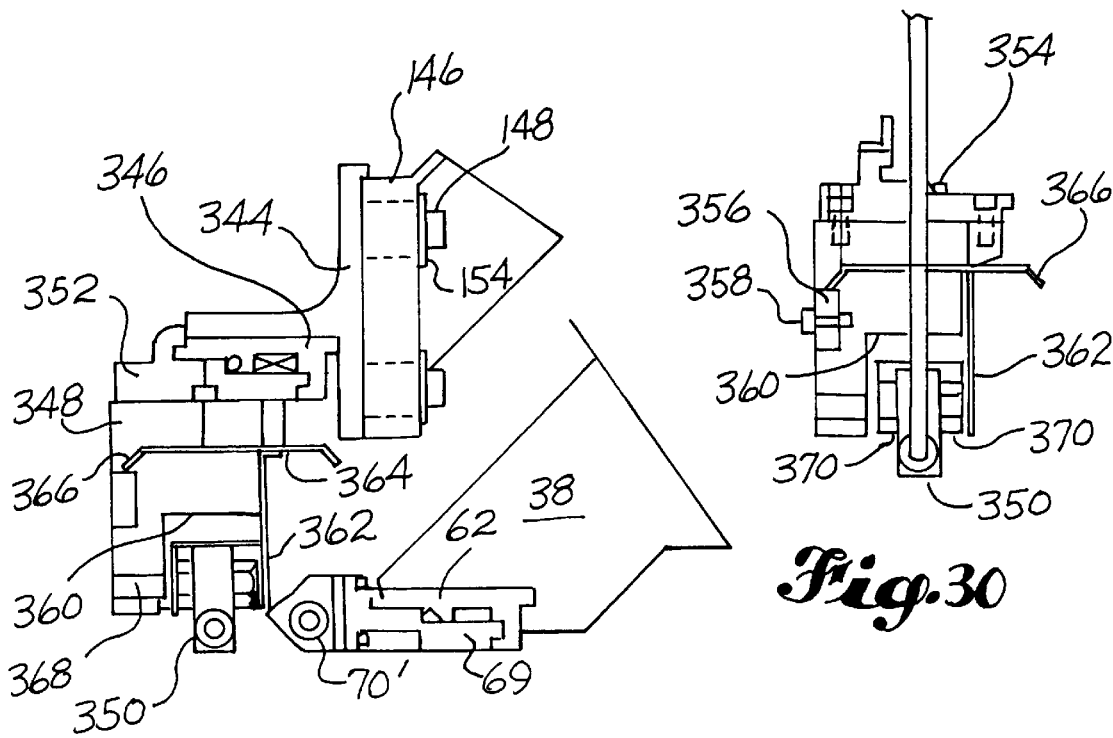
Fig. 30
Fig. 31
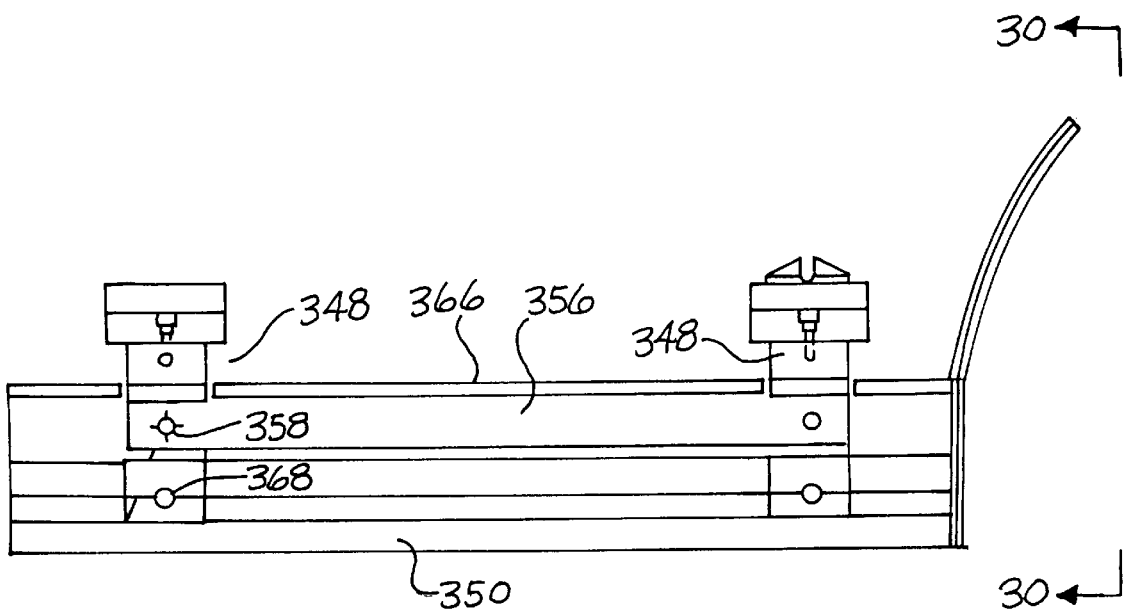
Fig. 29

THERMOPLASTIC PANEL BENDING

This invention pertains to a single step process and apparatus for producing smooth and strong bends of any desired radius in thermoplastic skinned honeycomb core panels, and pertains to a thermoplastic skinned honeycomb core panel having a smooth high strength bend with a folded-over skin at the inner radius of the bend.

BACKGROUND OF THE INVENTION

Honeycomb core panels with composite skins or face sheets on both sides of the core are widely used in industry, and in the aerospace industry in particular. They have a high strength-to-weight ratio and a high modulus for their weight, and can be shaped and attractively finished to provide many of the parts used in commercial airplane interiors, such as wall panels, stow bins, and lavatory and galley components.

Forming composite skinned honeycomb core panels into parts and components having bends has always been a difficult, time consuming, labor intensive and costly process. Usually the processes produce bends that have little strength and must be strengthened by application of supplemental strengthening plies. Various procedures for production of components and parts with a smooth, aesthetically attractive appearance and adequate strength have been developed and practiced in the past, but they are all excessively costly, multi-step processes that are tolerated only because of the need for light weight rigid components.

Thus, a need has long existed for a single-step process and apparatus for bending thermoplastic composite skinned honeycomb core sandwich panel into bends of any desired angle and bend radius. The bends would present an attractive appearance and would have sufficient strength to support the highest loads applied to interiors components in airplanes, plus a safety factor. The total cost of parts and components made using this process and apparatus would be less, and preferably much less, than the cost of such parts and components made using known processes and apparatus.

SUMMERY OF THE INVENTION

Accordingly, it is an object of this invention to provide a process and apparatus for forming high strength attractive bends in thermoplastic sandwich panels in a single continuous process. It is another object of this invention to provide a machine that performs all the steps of the process in a continuous automated sequence.

These and other objects of the invention are attained in a process and apparatus that clamps and holds a planar portion of the panel against movement parallel to the plane of the planar portion. A linear band of an inside face sheet is heated on one side of the panel with a heater bar to soften resin in the inside face sheet and disbond adhesive holding the inside face sheet to the honeycomb core. The linear band is formed into a bubble separated away from the honeycomb core by lifting the heater bar away from the panel and pulling the inside face sheet away from the core. A distal leg of the panel outboard of the clamped portion is bent around a heated anvil along an axis parallel to the linear band to form a bend, with the bubble coinciding with the inside of the bend. The bubble is collapsed around the inside radius and formed into an overlapping flap of inside face sheet. The overlapping flap of inside face sheet is pressed in a fold between the anvil and the bent leg of the panel, and the leg is held in the bent position while resin in the flap freezes or solidifies in the fold.

DESCRIPTION OF THE DRAWINGS

The invention and its many attendant objects and advantages will become better understood upon reading the following description of the preferred embodiment in conjunction with the following drawings, wherein:

FIG. 7 is a front elevation of the pivoted arm assembly shown in FIGS. 4 and 5, in the fully lowered position;

FIG. 8 is a front elevation of box brackets on the ends of the arms and a heater bar shoe on which the heater bars are supported;

FIGS. 9–11 are side elevations of the distal end of the pivoted arm assembly shown in FIGS. 4 and 5 with various tools used to produce three different types of bends in the thermoplastic panel;

FIG. 14 is a folded front elevation of a panel preloading mechanism shown in FIGS. 2 and 3 for predeflecting the panel;

FIG. 15 is an enlarged elevation of the detail indicated in FIG. 14;

FIG. 16 is a plan view of the detail shown in FIG. 15;

FIGS. 23–26 are schematic sectional side elevations of the machine shown in FIG. 5 with an anvil and heater bar shown in FIG. 10, illustrating several stages in the inventive bending process for producing a 45° bend;

FIG. 29 is a front elevation of a modified heater bar and mounting hardware for the heater bar;

FIG. 30 is an elevation along lines 30—30 in FIG. 29; and

FIG. 31 is an elevation from the right side of the heater bar and mounting foot from the side opposite to the side from which FIG. 30 is viewed, and also showing the mounting shoe and rail attached to the end of the arms of the heater bar positioning mechanism.

DESCRIPTION OF THE PREFERRED EMBODIMENT

Figure 1:
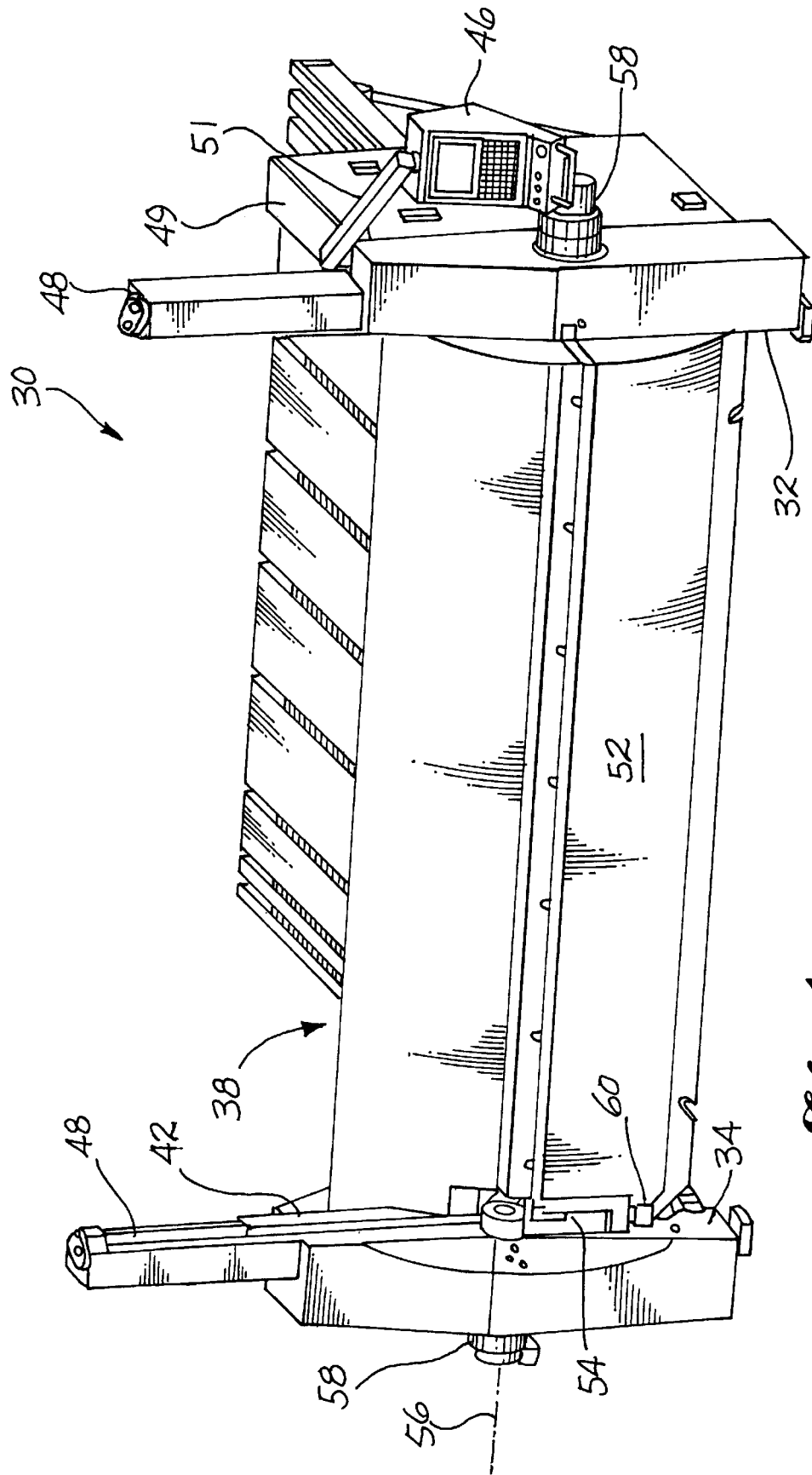
FIG. 1 is a perspective view of a commercially available radial brake press suitable for modifying to perform the panel bending process of this invention.
Figure 2:
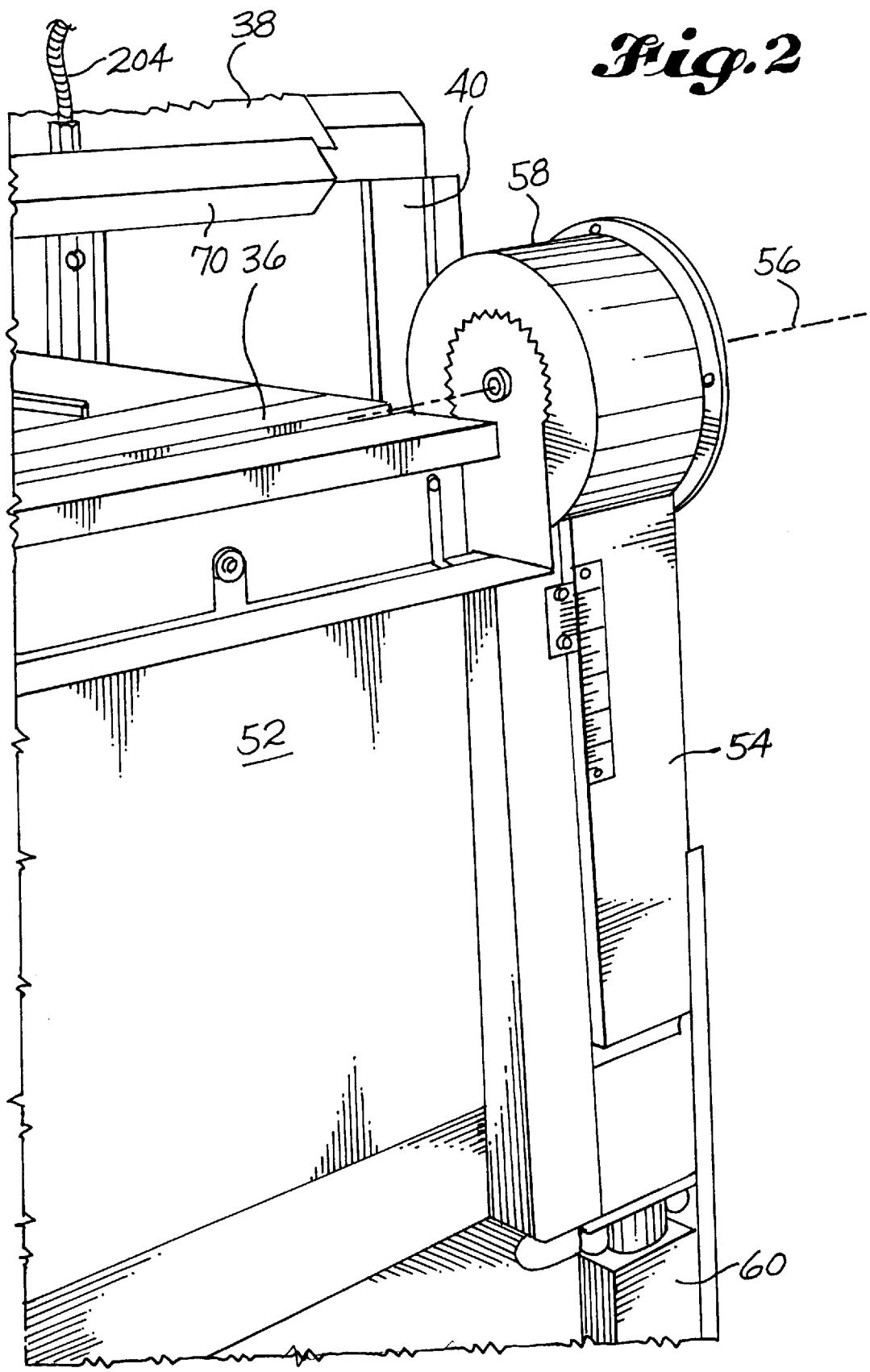
FIG. 2 is a perspective view of the radial blade driver on the machine shown in FIG. 1 used for bending thermoplastic skinned panels in accordance with this invention.

Turning now to the drawings, wherein like reference characters identify identical or corresponding parts, and more particularly to FIG. 1 thereof, a conventional radial blade brake press 30 for bending sheet metal is shown. The basic radial blade brake press shown is an RAS Model 74.30 "Multibend 8001" CNC sheet metal folding machine made by Reinhardt Maschinenbau GMBH in Sindelfingen, Germany and is distributed in the U.S. by Integrated Fabricating Technologies in Deerfield, Ill. Naturally, any machine that is capable of performing the functions of the process, described below, in an automated or manual sequence could be used, such as a model HBU4816 hand brake made by Tennsmith in McMinnville, Tenn.

Figure 3:
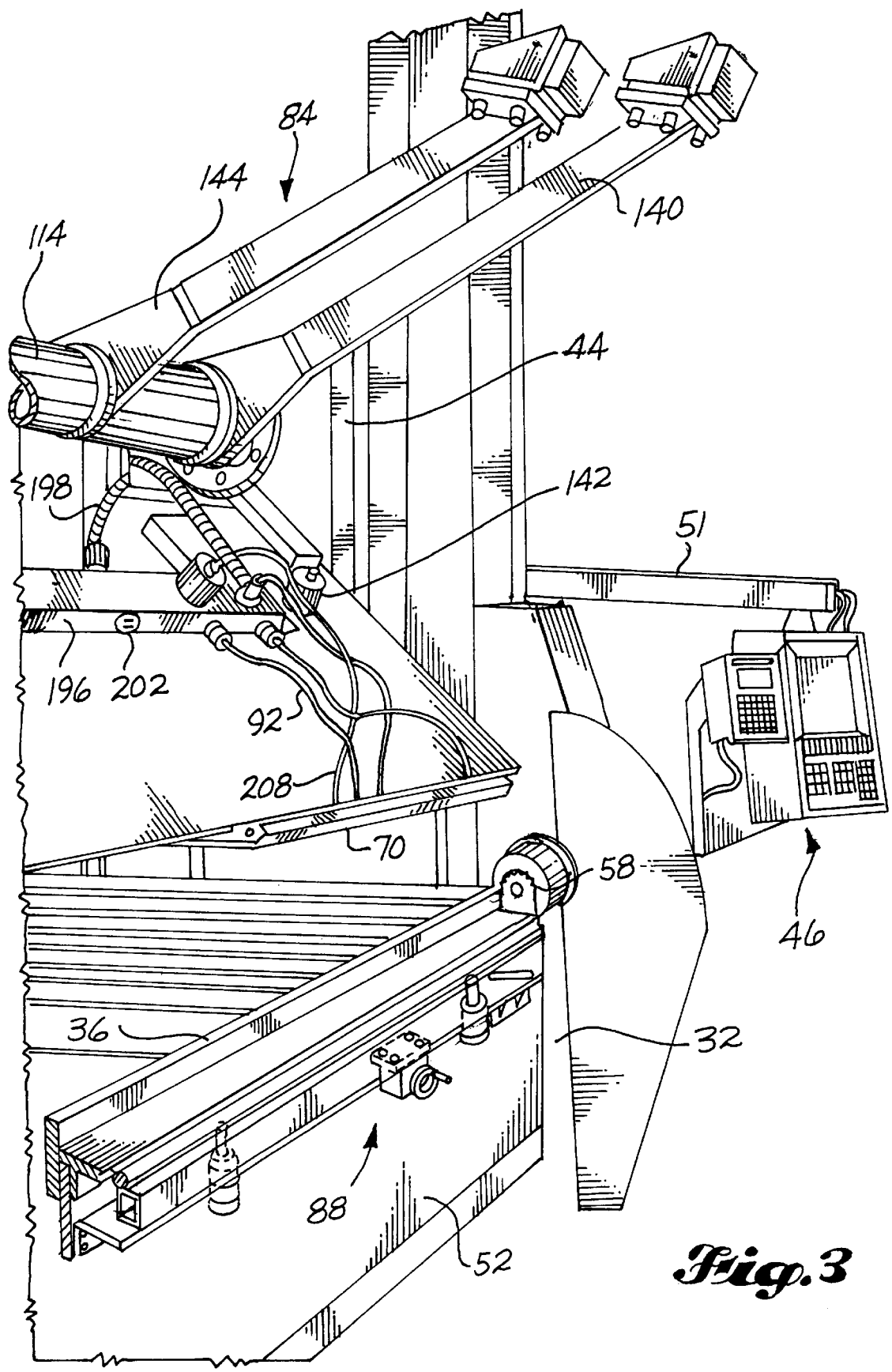
FIG. 3 is a perspective view of the radial brake press shown in FIG. 1 modified to perform the panel bending process of this invention.

The radial brake press 30 shown in FIG. 1 includes an H-frame having two upstanding sides 32 and 34, a lower platen 36 (shown in FIG. 5) and an upper platen 38. The upper platen 38 is guided for vertical movement in two guides 40 and 42, one each in two sides 32 and 34, respectively. An electrical control cabinet 44 is mounted atop the side 32, as shown in FIG. 3. The lower platen 36 is vertically adjustable to permit different modes of operation. A hydraulic cylinder 48 in each side provides controlled motive power to drive the upper platen 38 up or down under control of a machine controller 50 (shown only in the schematic in FIG. 12) mounted in an enclosure 49. Operator interface with the controller 50 is by way of a keypad and monitor unit 46 mounted on an arm 51 on one end (the "controller end") of the press 30. Communication between the operator interface unit 46 and the machine controller in the enclosure 49 is by way of cables routed through the arm 51.

A radial blade 52 is mounted at its two ends on linear bearings (not shown) in arms 54 which are pivotally supported in the side supports 32 and 34 for rotation about an axis 56. A hydraulic motor 58 is mounted on each of the side supports 32 and 34 for rotating the arms 54 about the axis 56 to swing the radial blade 52 in an arc about the axis 56. The radial blade 52 is radially adjustable along the arms 54 in the linear bearings relative to the axis 56. The radial adjustment is by way of a servomotor 60 mounted in the end of each arm 56 for driving a lead screw (not shown) in a ball screw (not shown) connected to the radial blade 52. Operation of the hydraulic cylinders 48, the servomotors 60, and the hydraulic motors 58 are under control of the machine controller 50 as programmed through the operator interface unit 46.

Figure 10:
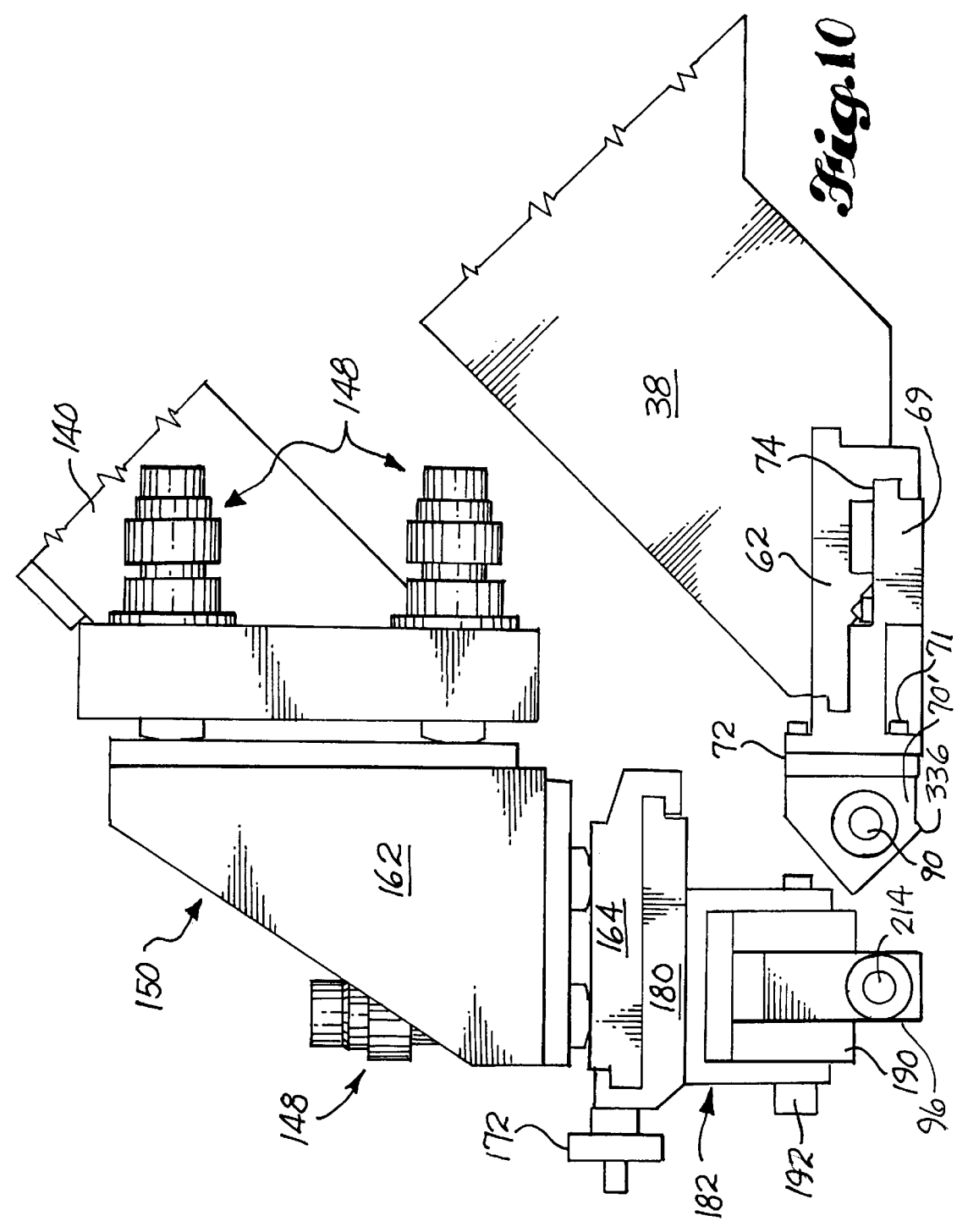

A tool holder 62, shown in FIG. 5, and shown in more detail in FIGS. 9–11, is mounted to the underside of the upper platen 38 for supporting a variety of tools 64 used in bending a thermoplastic skin cellular core panel 65, as explained in more detail below. The tools 64 include a variety of heated anvils 70 used in performing the inventive thermoplastic skin panel bending process described below. The tool holder 62 includes a forwardly projecting lip 66 and a forwarding opening recess 68 spaced rearwardly of and below the lip 66.

The thermoplastic skin cellular core panel 65 is typically a honeycomb core panel widely used in the aerospace industry. However, other types of cellular core panels are available and could be formed in bends and wrappers using the inventive process and the machine for performing the process. Foam core panels are another commonly used panel, and another type is an expanded polyimide fiber felt core panel sold by Albany International Corporation in Albany, N.Y. under the trademark "Pyropel".

The tool held in the tool holder 62 used in the thermoplastic panel bending process includes a base member 69 to which an anvil 70 is connected by screws 71 and is separated from the anvil by an insulator strip 72 made of suitable insulating material, such as NEMA Grade G7 "Micarta" structural insulation made of glass fiber reinforced silicone. The base member 69 includes a rearwardly projecting lip 74 sized to fit into the forwarding opening recess 68 in the tool holder 62, and a rearwardly opening recess 76 sized to receive the forwardly projecting lip 66 of the tool holder 62. A detent 77 is set into each base member 69 which engages a notch 78 in the tool holder 62 for holding the base member in position when the tool 64 is inserted into the tool holder 62. A recess 79 in the tool holder 62 receives an air hose (not shown) which engages a plurality of plates (not shown) in the recess 79 to press the plates against the top side 80 of the tool base members 69 for holding the tools 64 in position when the air hose is pneumatically pressurized. The force exerted by the plates against the base members 69 jams the faying surfaces of the tool holder recess 68 and lip 66 against corresponding faying surfaces of the lip 74 and recess 76 of tool base member 69 to lock the base member 69 in the tool holder 62.

The metal bending machine 30 shown in FIG. 1 is further modified as shown in FIGS. 2–17 to perform thermoplastic sandwich panel bending in accordance with this invention. The modifications include a heater bar assembly 82 and heater bar positioning mechanism 84. It also includes a heated anvil 70, a panel positioning system 86, a panel preloader 88, and a controller 50. These modifications are discussed in detail below.

The heated anvil 70 has an electrical heater rod 90 that fits with a close sliding fit into a bore drilled into the anvil 70 and is connected through the machine controller 50 by way of a power cable 92 to a source of electrical power, such as the local power grid. The close sliding fit militates for good thermal conductance between the heater rods 90 and the anvils 70 so the heater rods 90 do not reach elevated temperatures which would shorten their life.

Figure 4:
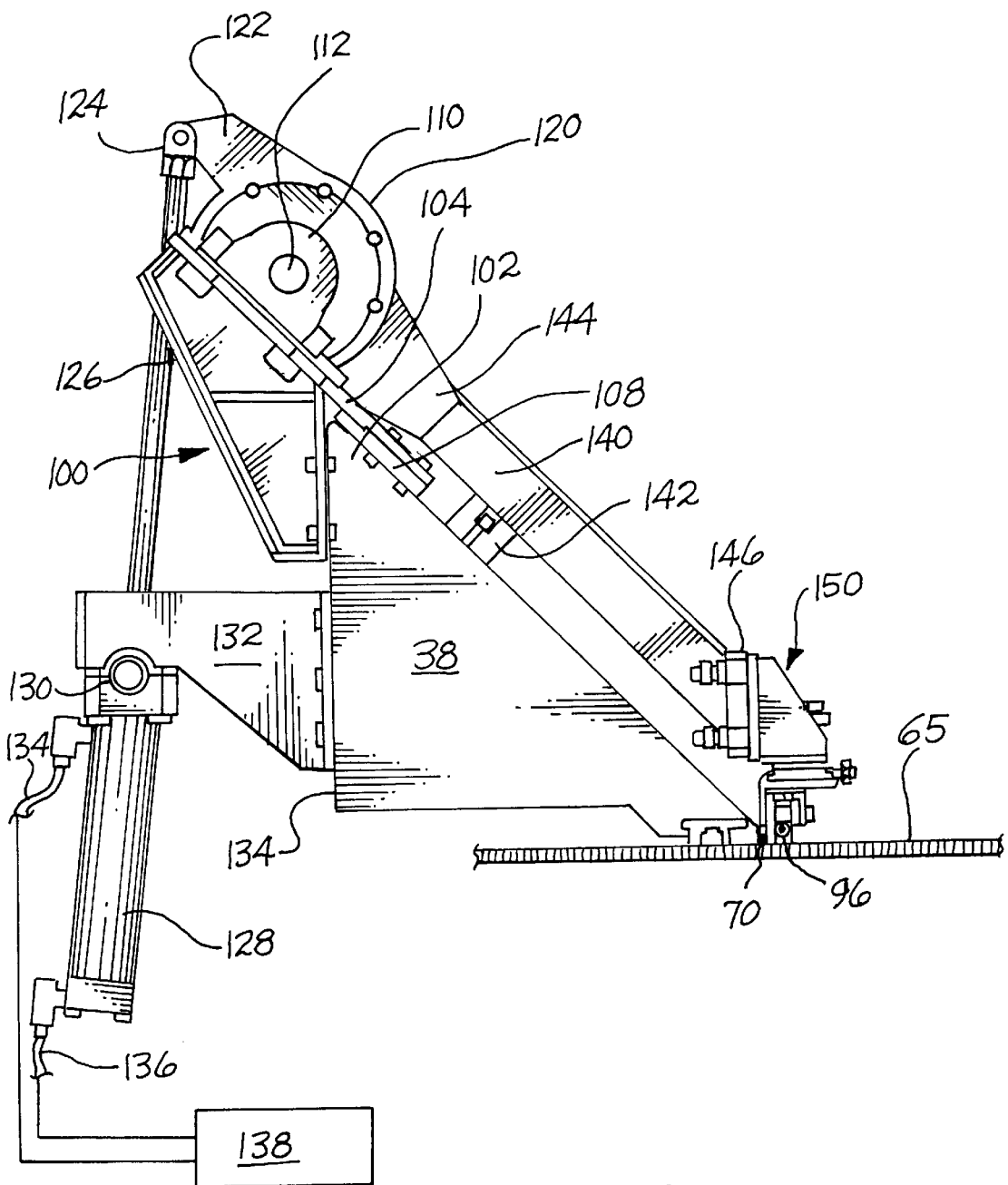
FIG. 4 is a side elevation, viewed from the left side of the machine shown in FIG. 3, of a pivoted arm assembly on which a heater bar assembly is mounted.
Figure 5:
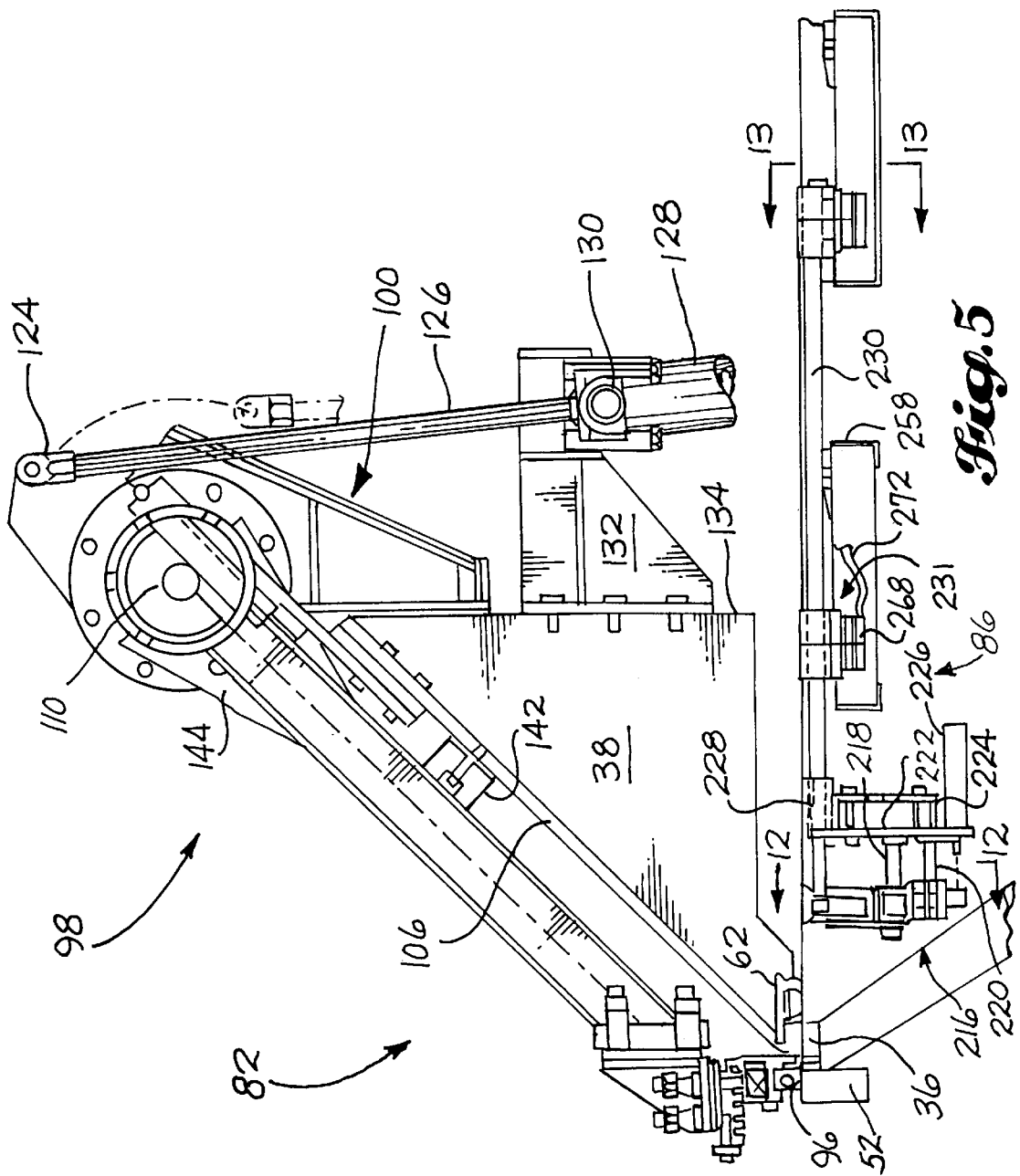
FIG. 5 is a side elevation, viewed from the right side of the machine shown in FIG. 3 in a closed position without a panel in the machine, showing the pivoted arm assembly and heater bar assembly and also showing a panel positioning system.
Figure 6:
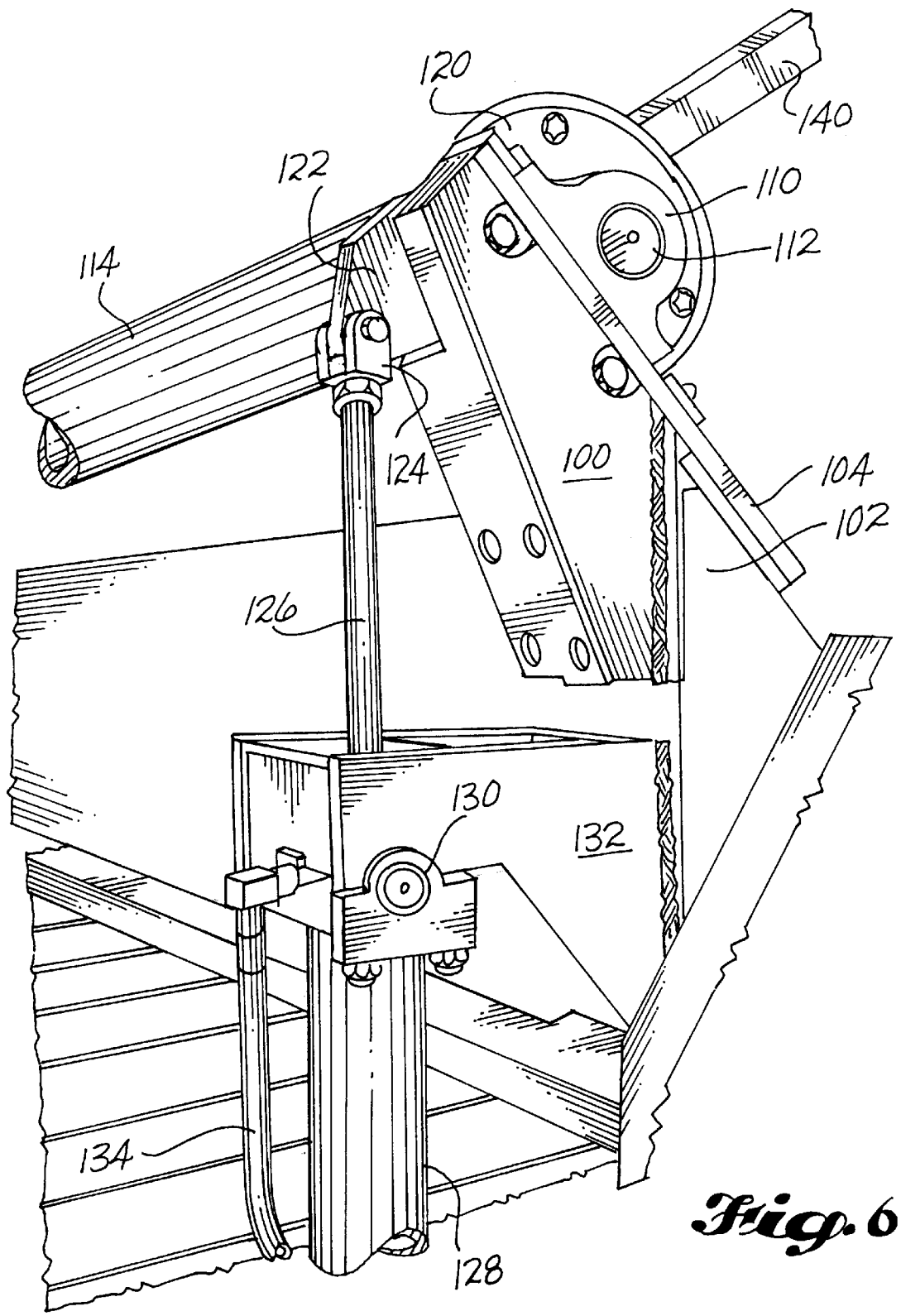
FIG. 6 is a perspective view of a mounting bracket and actuator for the pivoted arm assembly shown in FIG. 3.

The heater bar assembly 82, shown in FIGS. 3–5, includes a heater bar 96 mounted on the distal end of a pivoted arm assembly 98, in turn mounted on the top of the upper platen 38. As shown in FIGS. 6 and 7, the pivoted arm assembly 98 includes a mounting bracket 100 mounted on the apex 102 of the upper platen 38. The mounting bracket 100 has a top plate 104 attached to the sloping front face 106 of the upper platen 38 over a spacer block 108. A pillow block bearing 110 is bolted to the top plate 104 for rotatably supporting a stub shaft 112 at each end of a torque tube 114 for rotation about an axis 115. On the end of the torque tube 114 at the controller end of the press 30, the stub shaft 112 projects axially outward from a disc 116 on an end fitting bolted to a end disc 118 welded to the end of the torque tube 114. On the other end of the torque tube 114, the stub shaft 112 projects axially outward from an end fitting disc 120 to which is bolted an end disc 118 welded to the other end of the torque tube 114.

The disc 120 on the end fitting at the end opposite the controller end has a projecting finger 122, best seen in FIG. 4, having a hole drilled therethrough to which is pinned a rod-end clevis 124. The clevis 124 is attached to the distal end of a piston rod 126 of a piston (not shown) in a hydraulic cylinder 128 pivotally mounted in a bearing 130 mounted on the end of an arm 132 attached to the rear face 134 of the upper platen 38. A pair of hydraulic lines 135 and 136 coupled by fittings to the hydraulic cylinder 128 connect to a hydraulic power supply 138 for powering the cylinder 128 to operate the piston rod 126 with a long fast stroke. Pressurizing the cylinder 128 through the line 136 while venting the upper end of the cylinder through line 134 to the sump in the hydraulic power supply 138 extends the piston rod 126 from the position shown in FIG. 6 toward the position shown in FIGS. 3, 4 and 5. At the extended position of the piston rod 126, the finger 122 on the disc 120 is rotated clockwise in FIGS. 4 and 6 to rotate a set of arms 140 welded to the torque tube 114 downward to a fully lowered or depressed position against a set of stops 142 attached to the sloping front face 106 of the upper platen 38.

In the fully depressed position of the arms 140, the heater bar 96 mounted on the distal ends of the arms 140 is positioned on the same horizontal plane with the heated anvil 70, as shown in FIGS. 4 and 5, in contact with the upper skin of the panel 65. The heater bar 96 heats a band of the upper skin of the panel 65 to soften the thermoplastic resin in the upper skin and to disbond the adhesive holding the skin to the cellular core of the panel 65. In the elevated or raised position of the arms 140, as shown in FIGS. 3 and 6, the heater bar 96 is lifted well clear of the heated anvil 70 and out of position at which it could be accidentally contacted by workers operating the machine. The hot softened thermoplastic resin in the top skin of the panel 65 is sticky and tends to adhere to the heater bar 96, so lifting the heater bar 96 lifts the heated band of top skin away from the cellular core in a bubble 143. As the folding process proceeds, the bubble 143 is doubled over into a fold, and the fold is flattened into a flap which is welded down against the adjacent portion of the top skin by pressure against the anvil surface while the thermoplastic resin in the top skin cools to a solid state. This process is described in more detail below in connection with FIGS. 19–26.

As shown in FIGS. 3–5, the arms 140 are square structural aluminum tubing welded at their proximal ends to the torque tube 114 and reinforced with gussets 144. The gussets 144 have a semicircular profile at one end that contacts the torque tube 114 at an interface around half the periphery of the torque tube 114 and is welded around the full interface. The gussets 144 lie alongside both sides of all six arms and are welded thereto along adjoining edges.

An end plate 146, shown in FIGS. 5 and 8–10, is welded to the distal end of each arm 140 at a 45° angle to the axis of the arms 140 so that the end plates 146 are oriented vertically when the arms 140 are fully lowered against the stops 142. Four fasteners 148 secure a right angle box bracket 150, shown in FIGS. 8–11, to the outer face of each end plate 146 with a slight stand-off gap 152. The fasteners 148 each include a leveling jack 154 which provides an adjustable stand-off from the end plate 146, and a hex head screw 156 which extends axially through the leveling jack to hold the box bracket 150 to the end plate. The leveling jack 154 makes possible the precise adjustment of the angle of the box bracket 150 on the end plate 146 to ensure that the heater bar contacts the panel at the desired position and angle. The leveling jack used herein is a model ELJ-7502 sold by E&E Special Products in Detroit, Mich. Alternatively, shims or other known adjustment schemes could be used if adjustment capability is desired.

The box bracket 150 includes a base plate 158 and a mounting plate 160 disposed at a 90° angle to the base plate 158 and welded thereto with side plates 162. The mounting plate 160 has four threaded holes therein for receiving the hex head screws 156 by which the box bracket is fastened to the end plate 146. A heater bar shoe 164 is fastened to the underside of the base plate 158 by the same type of fasteners 148 as are used to hold the box bracket 150 to the end plate 146, also with a slight stand-off gap 166. The stand-off gaps 152 and 166 provide clearance for adjusting the angle of the box bracket 150 on the end plate 146, and the heater bar shoe 164 on the box bracket 150. pin 174/164

As shown in FIG. 9, the heater bar shoes 164 have two swing bolts 170 for holding heater bars on the heater bar shoes. The swing bolts 170 each include a thumb nut 172 threaded onto a threaded swing bolt shank 174 which lies in a slot 175 in the top front portion of the shoe 164. The shank 174 is pinned at its rear end in the slot 175 with a pin 176 and projects forwardly beyond the slot. The thumb nut 172 can be tightened down against the front face 178 of a heater bar mounting foot 180 that fits onto the shoe 164 in the same way that the tool base 69 fits onto the tool holder 62, also shown in FIG. 9.

A heater bar channel 182 has two spaced depending legs 184 and 186 connected by a cross member 188 and defining therebetween a elongated, downwardly opening space in which the heater bar 96 is supported between two "Marinite P" insulator bars 190. The cross member is secured to the underside of the heater bar mounting foot 180 by four fasteners 191 before the heater bar is installed in the channel 182. Shoulder bolts 192 extend through a hole in the leg 186 and holes in the two insulator bars 190 and the heater bar 96, and through two spacer bushings 194, one on each side of the heater bar 96, centering the heater bar in the channel 182. The bolts 192 each have a threaded end that is threadedly received in a tapped hole in the leg 184. The holes in the heater bar 96 are oversized so the heater bar can self-align on the surface of the panel when the arms 140 are lowered to the depressed position shown in FIG. 5.

An electrical duct 196 is fastened to the front face 106 of the upper platen 38 and is connected via an electrical cable 198 to the electrical control cabinet 44 fastened atop the side of the machine, shown in FIGS. 1 and 3. Switches (not shown) in the cabinet operating under control of the controller 50 energize the cable 198 and the duct 196 from an electrical power source, typically the local power grid. A plurality of electrical outlet sockets 202 are provided in the duct 196 into which electrical plugs of power cords 204 from the heater rods 90 in the anvils 70 can be connected. Temperature sensors 206 such as thermocouples are mounted in the anvils 70 and are connected to the control cabinet 44 by way of leads 208 plugged into the duct 196 and from there to the cabinet 44 by way of a conduit 210, whereby the controller 50 can maintain the temperature of the anvils 70 at the desired temperature.

A similar electrical duct 212 as used for the heated anvils 70 is used for the heater bars 96. Specifically, a duct is connected to the top surface of the arms 140 for providing electrical power to heater rods 214 in the heater bars 96. The same arrangement of power cords from the heater rods 214 that terminate in electrical plugs connecting into electrical outlet sockets in the duct 212, temperature sensors in the heater bars connected by leads to the duct 212, and electrical conduits for conducting electrical power from the cabinet 44 and electrical signals from the temperature sensors to the cabinet 44. These electrical elements are not shown in the same detail since they are basically the same as the elements shown for the heated anvils 70.

Panel Positioning System

Figure 13:
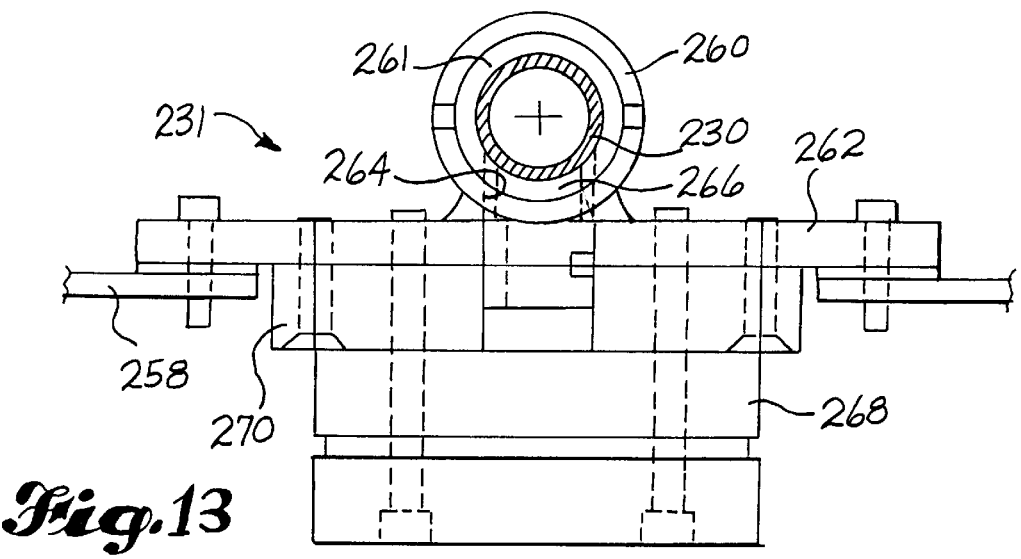
FIG. 13 is an elevation along lines 13—13 in FIG. 5, showing a tube gripper for the panel positioning system.
Figure 12:
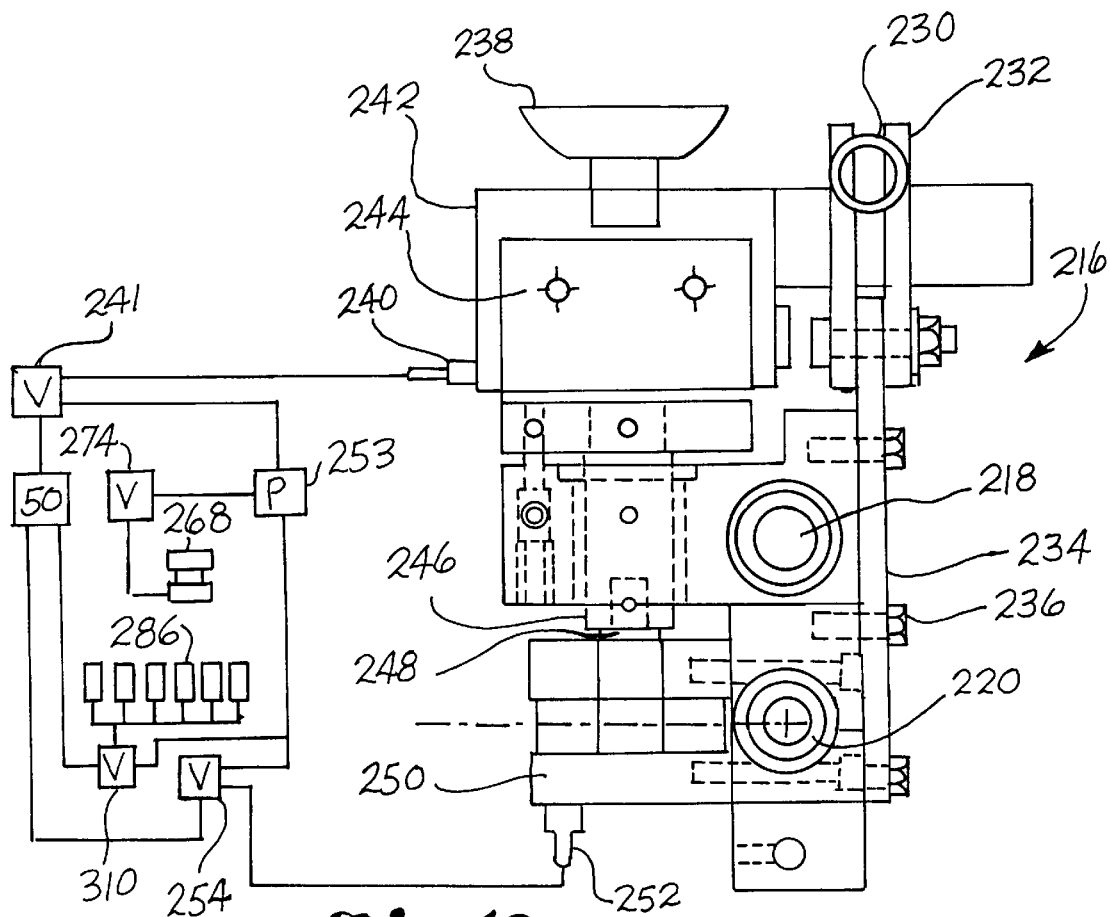
FIG. 12 is a front elevation along lines 12—12 in FIG. 5 showing a suction head of the panel positioning system for positioning the panel in the machine shown in FIG. 3.
Figure 18:
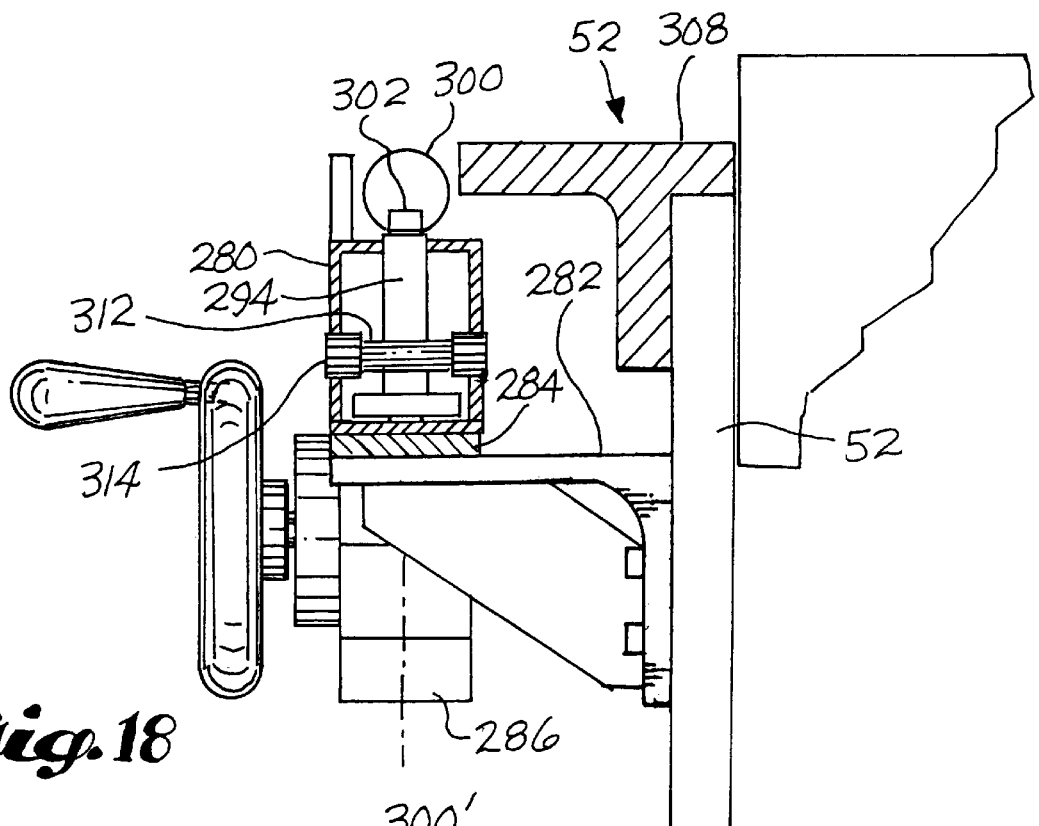
FIG. 18 is a sectional side elevation along lines 18—18 in FIG. 15.
Figure 17:
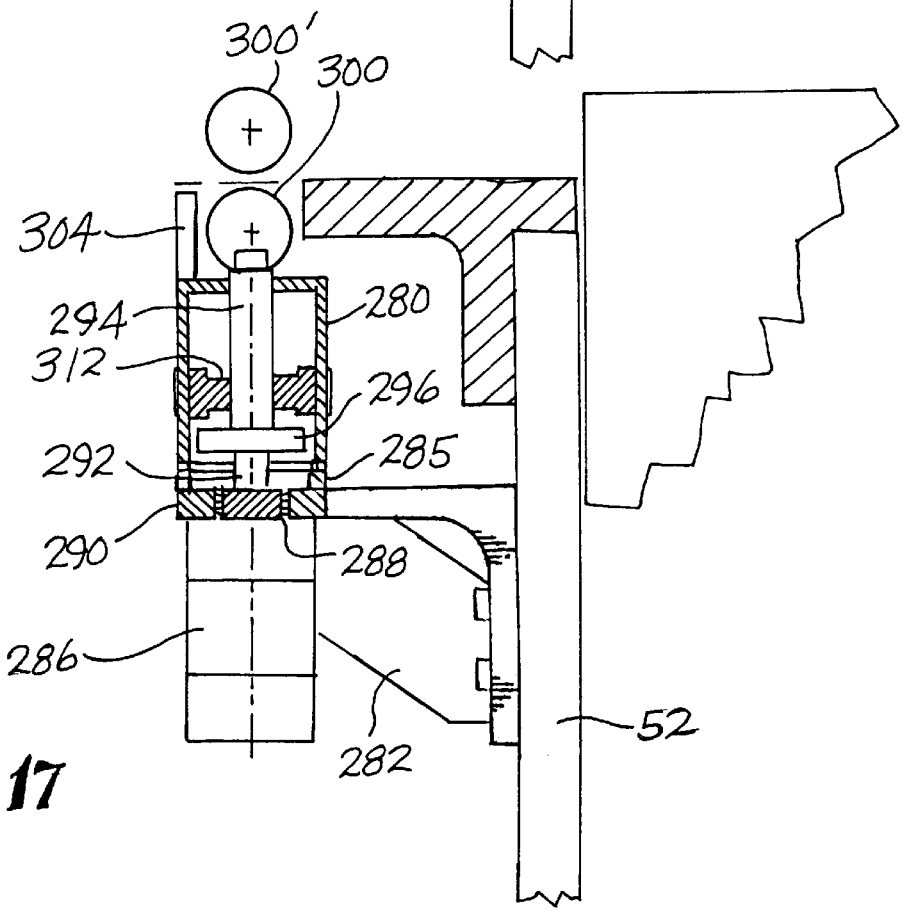
FIG. 17 is a sectional side elevation along lines 17—17 in FIG. 15.

The panel positioning system 86, shown in FIGS. 5, 12 and 13, is used to position the panel when forming bends and angles with heater bars and anvils that cannot be placed in a closely adjacent or abutting relationship. That is, when the shape of the anvil or the heater bar, or both, produces a heated band on the panel that is not adjoining the line of contact of the anvil on the panel, the panel positioning system can be used to shift the panel after heating to position the heated band on the panel adjacent the line of contact of the anvil on the panel and to produce bands and angles of superior strength and appearance.

The panel positioning system 86 includes a vacuum head 216 mounted for front and back motion on a linear bearing rail 218 and on a guide post 220 vertically spaced below the bearing rail 218. Both the bearing rail 218 and the guide post 220 are attached to a mounting plate 222 which is fastened to a cross beam 224 extending laterally across the machine as part of the structural bracing of the machine. The mounting plate 222 extends above and below the cross beam 224 for mounting an air cylinder 226 at the lower end of the plate 222 and an optional guide sleeve 228 at the top end of the plate 222. A pull tube 230 for pulling the vacuum head 216 and the panel to the rear is connected at its front end to the vacuum head 216 and is releasably held along its rear portion by a tube gripper 231, shown at the two extreme limits of its motion in FIG. 5. The pull tube 230 is welded at its front end to a pair of spaced connector bars 232 which are bolted to a puller arm 234, fastened in turn to the side of the vacuum head 216 by screws 236.

The vacuum head 216 grips the panel with suction applied to a suction cup 238 from an ejector pump 241 in the suction module 242 that creates suction by the venturi effect of pressurized air from an air line 240, passing through a restriction in the ejector pump 241. The suction cup 238 is part of a suction module 242 fastened into an upwardly opening channel 244 mounted on an extension 246 of a piston rod 248 of an air cylinder 250. Pressurizing the cylinder 250 through an air line 252 from a source 253 of air pressure by way of an air valve 254 under control of the controller 50 extends the piston rod 248 and the extension 246 to lift the vacuum module 242 and the suction cup 238 into contact with the underside of the panel. Suction is created in the vacuum module 242 by an ejector style vacuum pump (not shown) that uses a venturi created by pressurized air from valve 241 delivered through an air line 240 under control of the controller 50, as shown in FIG. 5, to grip the panel.

Movement of the panel is effected by gripping the panel 65 with the vacuum head 216 and pulling the vacuum head toward the rear of the machine with the pull tube 230. The tube gripper 231 is fastened to a translating box beam 258 in a back gauge table which is a standard feature on the RAS metal bending machine 30. The box beam 258 extends laterally across the machine 30 and is driven backward and forward by a pair of lead screws rotated by servomotors (not shown) for setting the back gauges on the machine.

As shown in FIGS. 12 and 13, the tube gripper 231 includes a outside tube 260 welded to a base plate 262 and an inner liner sleeve 261 of low friction material such as aluminum-silicon bronze held in place in the outer tube with set screws. The pull tube 230 extends through the inner liner sleeve 261 and slides smoothly therein until the tube gripper is actuated. The base plate 262 is fastened to the top web of the box beam 258 around the peripheral edge of an opening into which the lower portions of the tube gripper extend. A downwardly opening axially elongated slot 264 in the tube 260 is aligned with another slot of equal size and shape in the inner liner sleeve 261 and in the base plate 262 to receive a vertically movable pressure foot 266 attached to the top of a piston rod of an air cylinder 268. The air cylinder 268 is attached through a doubler plate 270 to the underside of the base plate 262. The pressure foot 266 has a rubber sole vulcanized to the top surface of the pressure foot 266 to provide a high friction grip on the pull tube 230 when the air cylinder is pressurized.

An air line 272 connects the air cylinder 268 through a valve 274 to the source 253 of air pressure. Operation of the valve 274 is under control of the controller 50 which opens the valve 274 to pressurize the air cylinder 268 and jam the rubber sole of the pressure foot against the pull tube 230 extending through the inner liner sleeve 261 to lock the tube gripper 231 to the pull tube 230 so the pull tube 230 and the attached vacuum head 216 move with the box beam 258 when the box beam moves.

Panel Preloader

The panel preloader or pre-deflector 88, shown in FIGS. 14–18, includes an elongated rectangular cross-section tube 280 supported atop a series of six bracket weldments 282 fastened to the front face of the folding radial blade 52. A doubler plate 284 lies between each bracket 282 and the tube 280, and has an extension 285 projecting beyond one side of the brackets 282 to provide a rigid cantilevered hanger to which a pneumatic cylinder 286 is attached adjacent each bracket 282. The cylinders 286 each include an externally threaded collar 288 threaded into an internally threaded hole in a base plate 290, bolted in turn to the hanger extension 285.

A piston rod 292 extends vertically from the cylinders 286 through an opening in the hanger extension 285 and slides into an axial bore in the end of a stand-off rod 294, where it is fixed by a set screw threaded into a disc 296 welded to the lower end of the stand-off rod 294. The top end of the stand-off rod 294 extends through an opening in the top of the rectangular tube 280 and supports on its top end a deflecting tube 300, secured to the top of the stand-off rod 294 by cap screws 302 threaded into tapped holes in the end of the rod 294. A shield bar 304 is welded to the top front edge of the rectangular tube 280 and stands upright in front of the deflecting tube 300 to protect the tube 300 and the stand-off rod 294 and piston rod 292 from damage that could be caused by accidental bumps in the factory.

The brackets 282 each have a slot 306 through which bolts extend and are threaded into the front of the folding blade 52 to secure the brackets in place. Slots 306 are used instead of holes to enable the brackets 282 to be vertically adjusted to position the top surface of the deflecting tube 300 just flush with or slightly below the top surface 308 of the folding beam 52 when the deflecting tube 300 is in its retracted position shown in FIG. 18. The cylinders 286 can be pressurized by air under pressure admitted under control of the controller 50 through a valve 310 from the source 253 of air pressure to lift the deflecting tube 300 to an elevated position indicated in FIG. 17 as 300' to facilitate the bending process, as described below.

Adjustment of the radial blade 52 vertically on the machine changes the vertical position of the panel preloader or pre-deflector 88 relative to the lower platen 36, so it is desirable to control the elevation of the deflecting tube 300 to accommodate the adjustment of the vertical position of the radial blade 52. A limit bar 312 lies within the rectangular tube 280 and is supported therein on cam rollers 314 which are attached in notches in the limit bar 312 and project outwardly into diagonal slots 316 in the rectangular tube 280. Translation of the limit bar in the lengthwise direction of the rectangular tube 28 causes the cam rollers 314 to roll up or down the edges of the slots 316 in the walls of the rectangular tube and move diagonally upward or downward while remaining parallel to the axis of the rectangular tube 280. The limit bar 312 has lengthwise slots therethrough which receive the stand-off rods 294 but are too narrow to pass the discs 296. When the air cylinders 286 are pressurized, the piston extends upward, lifting the deflecting tube 300 to the limit of the engagement of the discs 296 with the limit bar 312. Thus, the position of the limit bar 312 controls the upward extension of the deflecting tube 300.

The longitudinal translation of the limit bar 312 is caused by longitudinal movement of a vertical shoulder pin 318 which is seated into a stepped vertical hole in a slide block 320 slidably supported in a slide housing 322 which is a section of rectangular tube secured to the underside of the rectangular tube 280. A tapped through bore 324 in the slide block 320 receives a threaded rod 326 which also extends through a lateral hole in the lower portion of the shoulder pin 318. One end of the threaded rod 326 has an enlarged cylindrical head 328 with a diametric hole perpendicular to the axis of the threaded rod 326. The cylindrical head 328 is connected to a right angle gear box 330 by a set screw 332 that couples the output shaft of the gearbox in an axial socket in the cylindrical head. A suitable right angle gearbox 330 is a Stock Model S272-2RR12 made by Stock Drive Products in New Hyde Park, N.Y.

Figure 26:
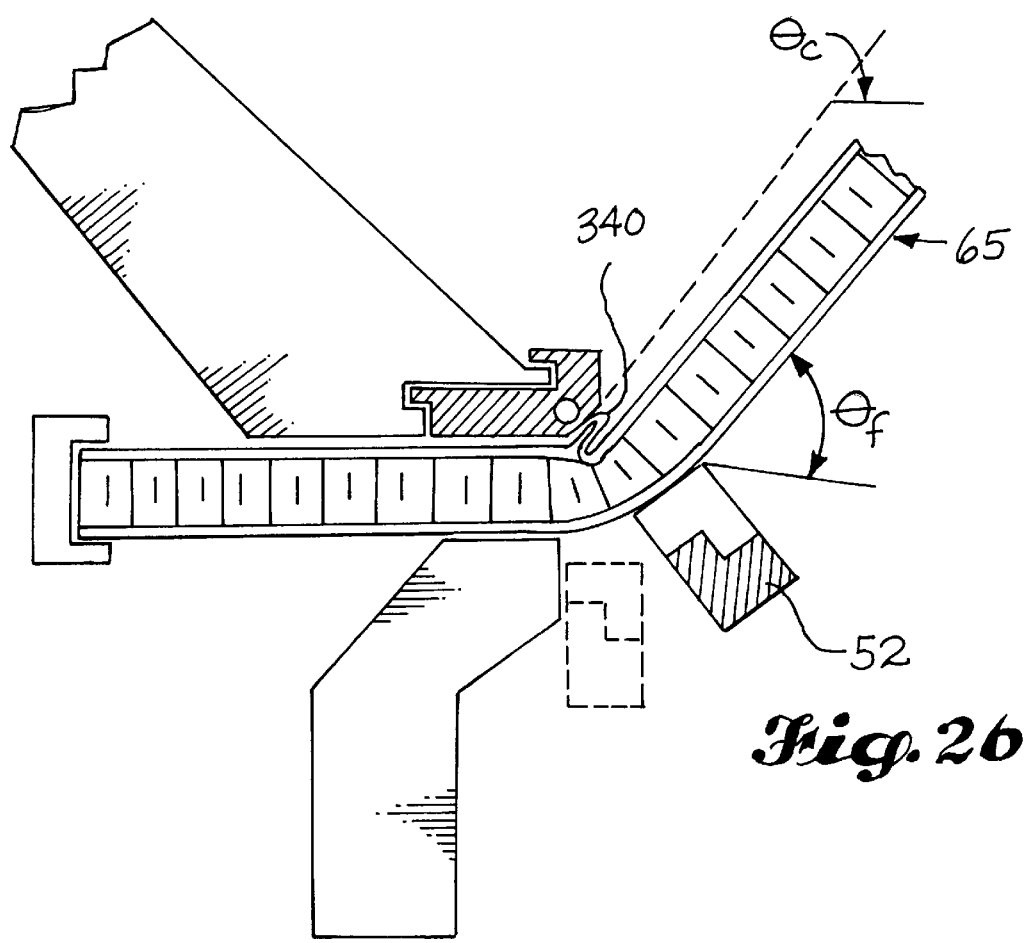
Figure 27:
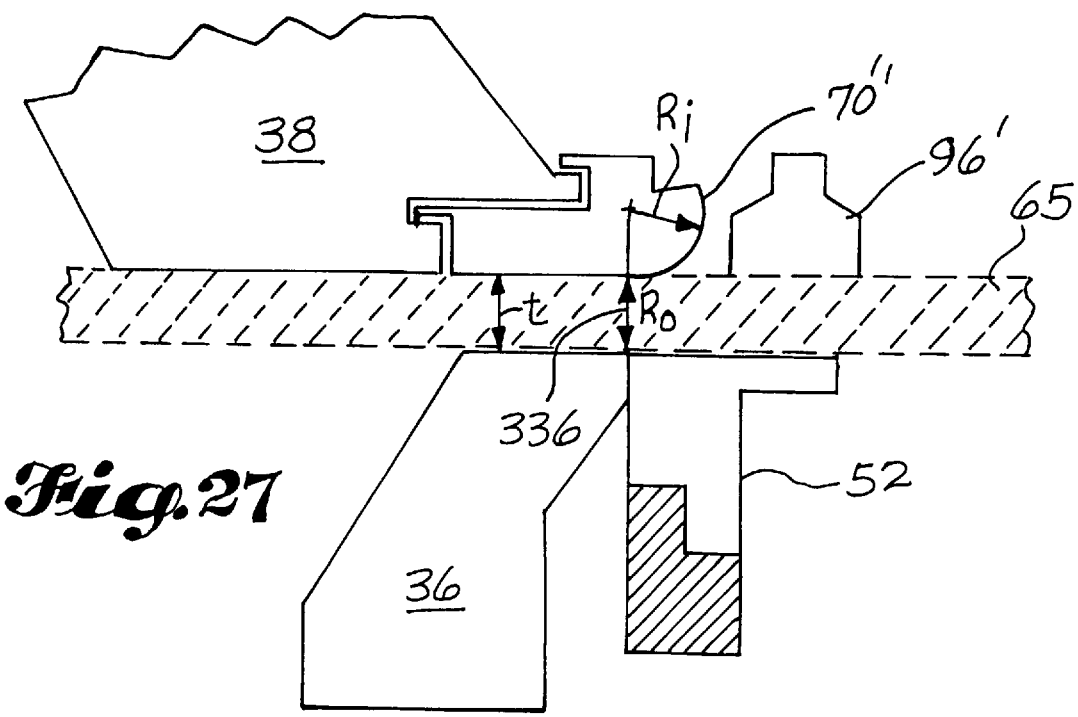
FIGS. 27 and 28 are schematic sectional side elevations of the machine shown in FIG. 5 with an anvil and heater bar shown in FIG. 11, illustrating several stages in the inventive bending process for producing a 90° wrapper.
Figure 28:
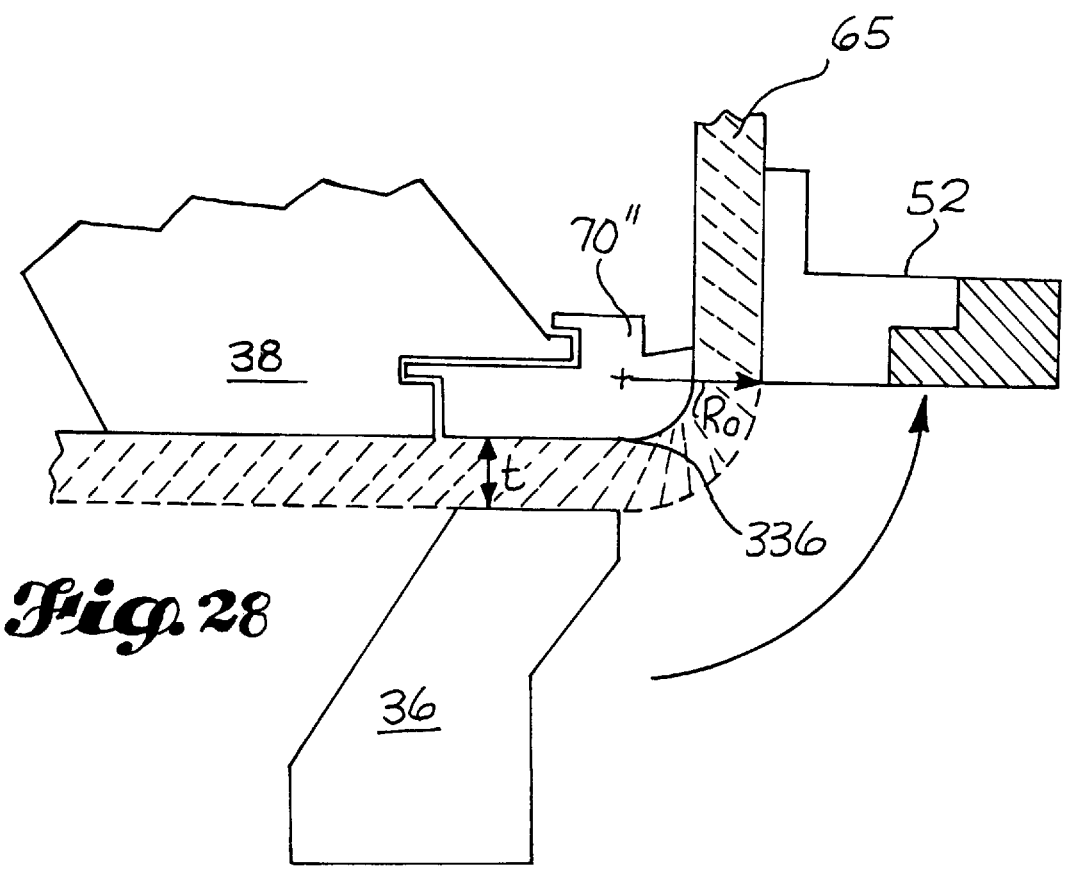

Adjustment of the vertical extension of the deflecting tube 300 is to ensure that the overhanging portion of the panel is deflected upward a small amount, on the order of about 0.5°–5.0°, preferably in the range of about 1°–3° when the panel is clamped in the press between the upper platen and anvil above, and the lower platen below. This deflection of the panel compensates for the tendency of the overhanging portion of the panel to droop under the influence of gravity, which would put the upper skin in tension and make formation of the bubble 143 along a band of the top skin difficult, and also facilitates formation of the bubble 143 by putting the top skin in compression adjacent the anvil where the heater bar contacts the panel. The adjustment is desirable because certain types of bends called "wrappers" use a lowered position of the lower platen and a flush position of the folding beam 52, as shown in FIGS. 27 and 28 and described in detail below. Adjustment is also required to compensate for various panel thicknesses and fold angles. In the case of the types of folds shown in FIGS. 19–26, changes in panel thickness and fold angle necessitate radial adjustment to the folding beam. Compensating adjustment of the preloader 88 for the radial adjustment of the folding beam 52 is usually necessary.

Operation

The panel bending machine operates in two basic modes. The first mode performs simple right angle bends using a rectangular anvil 70 as shown in FIG. 9 and does not require movement of the panel between bubble formation and bending. The second mode produces bends having a fold angle less than 90°, or "wrappers" having an outside radius greater than the panel thickness. Bends and wrappers of this second mode are produced using anvils of the types shown in FIGS. 10 and 11 and require that the panel be moved, after heating with the heater bar and formation of the bubble, to a position closer to the anvil for bending and flap welding. These two modes of operation will be described in detail below.

Operation of the first mode, illustrated in FIGS. 19–22, begins with a panel 65 clamped and securely held in position between the upper platen 38 and the lower platen 36. The top front edge of the lower platen 36 is vertically aligned with the front tangent of the anvil with the panel. The front tangent of the anvil 70, shown in FIGS. 9 and 19, used for 90° bends, is the lower front corner of the anvil 70. The vertical position of the folding beam 52 is set according to the following relationship:

$$R_{fb} = T(1 - \cos\theta)$$

where $R_{fb}$ is the radius of rotation of the folding beam 52, and

T is the thickness of the panel.

Figure 19:
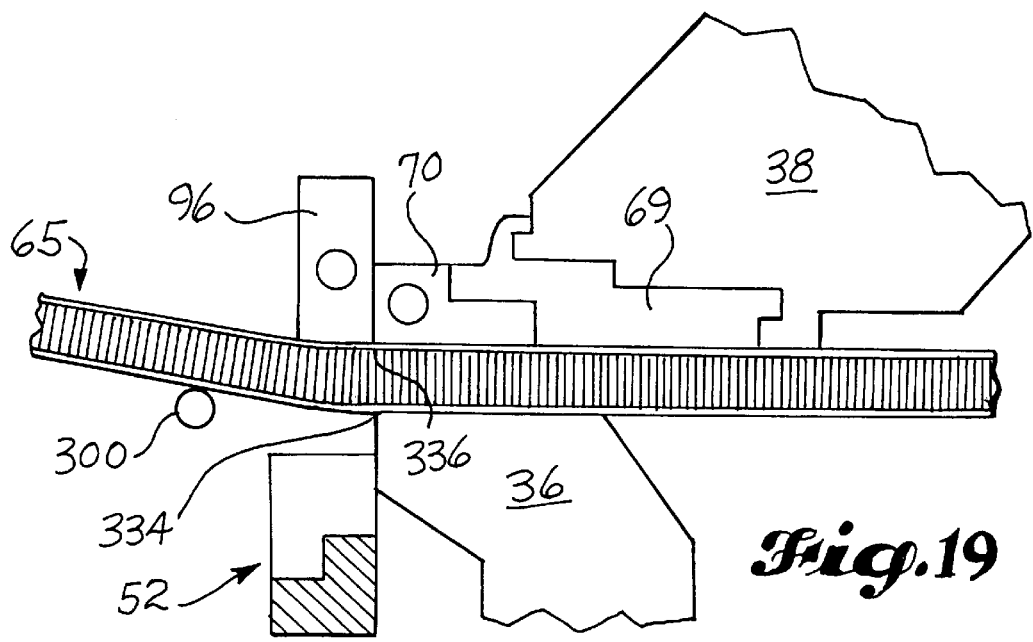
FIGS. 19–22 are schematic sectional side elevations of the anvil and heater bar operation on a thermoplastic panel in the machine shown in FIG. 5 with a heater bar and anvil shown in FIG. 9, showing several stages in the inventive bending process for producing a 90°0 bend in a panel.

The heater bar 96 is shown in its lowered position in FIG. 19, in contact with the upper surface of the panel 65. The position of the heater bar 96 is flush against the side of the anvil 70 because the upright configuration of the sides of the anvil 70 makes it possible to lower the heater bar into an abutting position as shown. The heater bar 96 heats a band of the upper face sheet of the panel 65 adjacent the anvil 70 to a temperature at which the thermoplastic resin in the upper skin softens and the resin bonding the upper skin to the cellular core loses its adhesive strength, either by reaching the glass transition temperature, in the case of epoxy adhesive, or by softening or melting in the case of a thermoplastic adhesive. The temperature and soak time of the heater bar 96 will vary with the resin composition, type of fiber in the face sheet plies, number of plies, and volume percent of resin in the face sheets. The following chart gives several examples of typical face sheet materials, all adhered to a honeycomb core of the panel with a 0.003" thick layer of epoxy and using 50% by volume PEI thermoplastic resin as the matrix for the face sheet fiber:

| Composition | | Process variables | | | |
| --- | --- | --- | --- | --- | --- |
| Number of plies | Fiber type | $T_{bar}$ | Soak time | $T_{clamp}$ | Cool time |
| 1 | glass | 625° F. | 55 sec. | 225° F. | 60 sec. |
| 1 | graphite | 675° F. | 30 sec. | 225° F. | 60 sec. |
| 2 | glass | 600° F. | 55 sec. | 225° F. | 120 sec. |
| 2 | graphite | 650° F. | 55 sec. | 225° F. | 120 sec. |

In the configuration shown in FIGS. 9 and 19–22, the heater bar is in contact with the anvil 70 during the soak cycle shown in FIG. 19, so it is possible to eliminate the heater rod 90 in the anvil 70. However, the heater rod 90 and thermocouples are preferred because of the greater degree of temperature control they provide for the anvil 70.

The deflecting tube 300 of the panel preloader 88 is elevated against the underside of the panel 65 to predeflect the distal end of the panel upward, as shown in FIG. 19, to support the panel against sagging down under its own weight, which would put the upper face sheet in tension and make formation of the bubble 143 difficult or impossible. Upward deflection instead puts the upper face sheet of the panel 65 in compression and facilitates the formation of the bubble 143.

Figure 20:
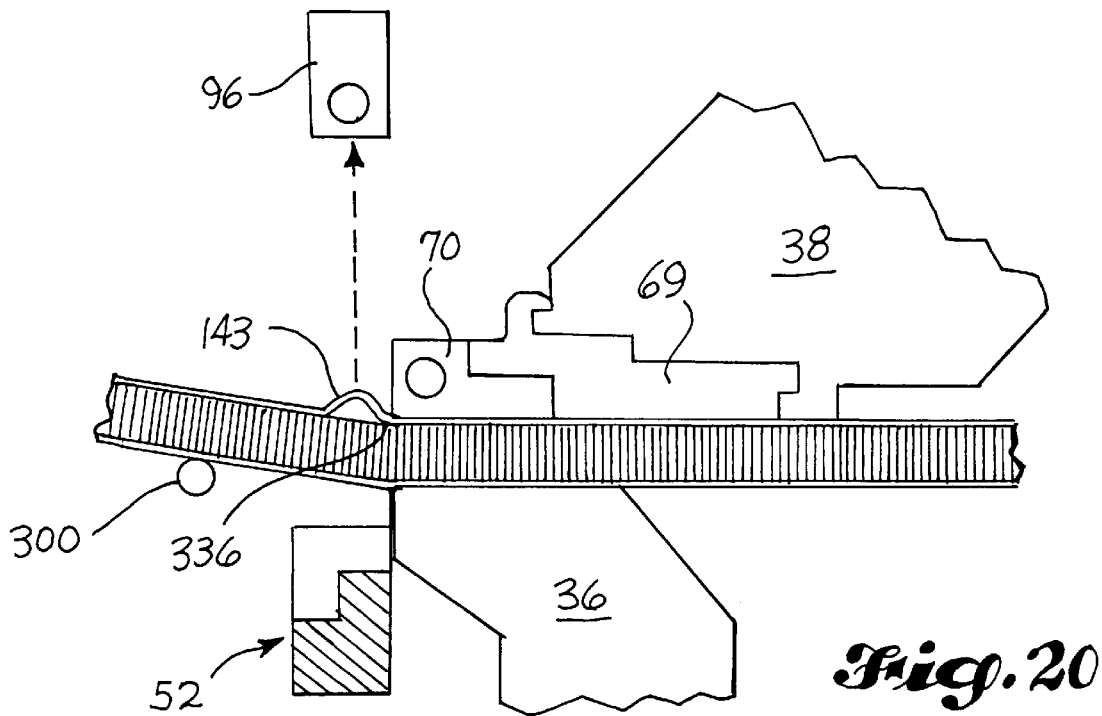

After heating the band of the upper face sheet with the heater bar 96 for a soak time of predetermined duration, the heater bar 96 is raised, as shown in FIG. 20, by pressurizing the cylinder 128 through the hydraulic line 134, thereby retracting the piston in the cylinder 128 and the attached piston rod 126 and rotating the arms 140 of the pivoted arm assembly 98 about the axis 115. The softened thermoplastic resin in the face sheet is sticky and adheres lightly to the faying surface of the heater bar 96. Lifting the heater bar 96 away from the panel 65 lifts the heated band of face sheet away from the cellular core of the panel 65, forming the bubble 143 as shown in FIG. 20. The upward predeflection of the distal end of the panel 65, putting the region of the upper face sheet of the panel just outboard the anvil 70 into a state of compression, also facilitates formation of the bubble 143, and the thermal expansion of the heated band of face sheet heated by the heater bar 96 increases the unstressed width of face sheet material in band region beneath the heater bar, enhancing the bubble forming effect.

Immediately after the bubble 143 is formed by lifting the heater bar away from the surface of the panel 65, the folding blade 52 is actuated by energizing the drive motors 58 to rotate the folding blade 52 about the rotational axis 56. The upper edge of the folding beam, optionally formed in a flange 332 shown in FIGS. 17 and 18, rotates around the axis 56 and engages the distal end portion of the panel cantilevered outboard of the portion clamped between the upper and lower platens. The center of rotation of the folding beam coincides approximately with the upper front edge 334 of the lower platen in FIGS. 19–26, and the level of the top surface of the lower platen 36 is horizontally aligned with the rotational axis 56 of the folding blade 52.

Figure 21:
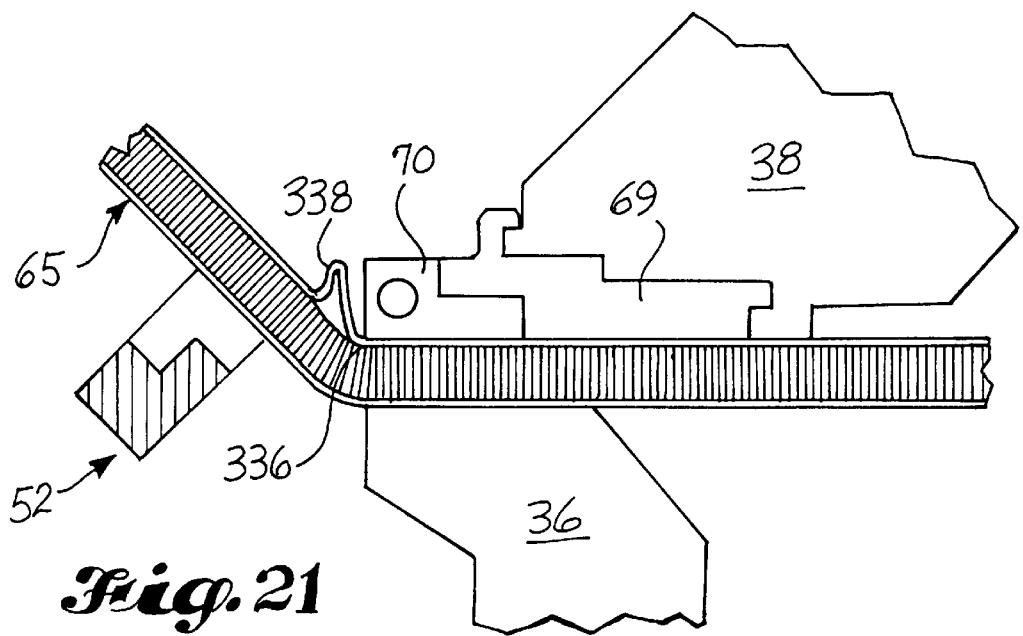

Upward rotation of the folding beam 52, illustrated in FIG. 21, bends the distal portion of the panel 65 upward about the tangent line 336 of the anvil 70. Since the folding beam now contacts and supports the distal portion of the panel 65, the deflecting tube 300 is no longer needed for support of deflection and is retracted by depressurizing the pneumatic cylinders 286 and allowing the resisting force of the panel to push the piston and its piston rod 292 back into the piston 286 as the folding beam rotates counterclockwise in FIG. 21.

Figure 22:
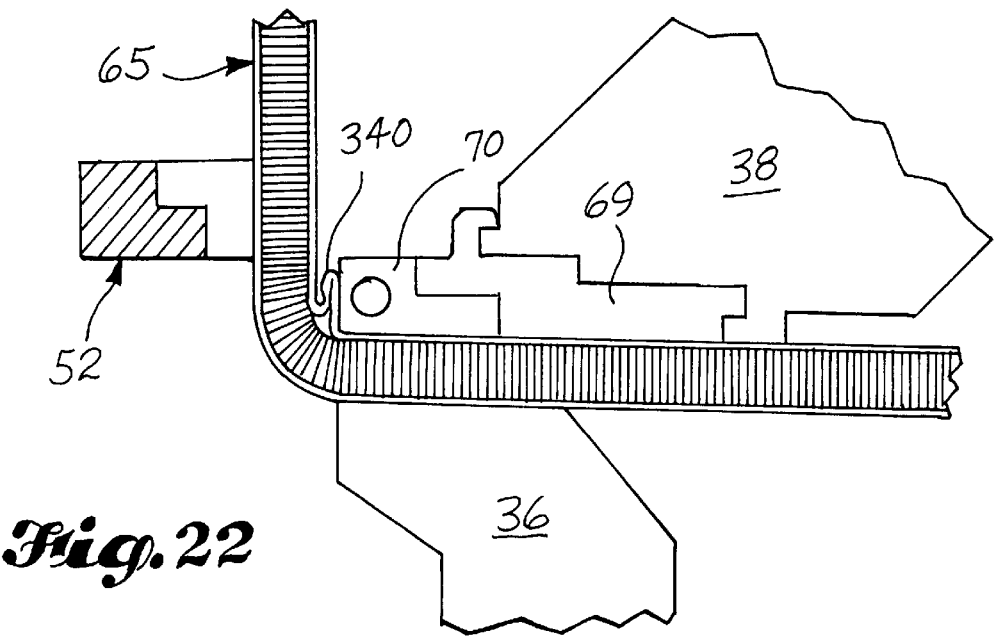

As the panel bends upward about the tangent line 336 of the anvil 70, the bubble 143 begins to collapse into a fold 338, as shown in FIG. 21. The material of the face sheet in the bubble 143 doubles over on itself in the fold 338 as the inside radius of the bend in the panel 65 decreases. Continued upward bending of the panel 65 irons the fold 338 against the heated anvil 70 in a flattened flap 340, as shown in FIG. 22. The final few degrees of upward bending motion of the panel 65 forces the upper face of the panel 65 just outboard of the tangent line 336 of the anvil against the outer face of the anvil, exerting high pressure on the flattened flap 340 and embedding the flap 340 slightly into the cellular core. The high pressure exerted on the flap 340 presses the overlapping folds of the flap into intimate contact so the softened thermoplastic resin in the overlapping folds of face sheet material can flow together and be thermoplastically welded together. The folding beam 52 is held at its extreme upwardly rotated position, holding the panel in the fully bent position against the outer face of the anvil while the resin in the flap 340 cools below its softened temperature. After cooling, the folding beam is rotated back to its starting position and the press is opened to release he bent panel for removal from the press.

From the moment that the heater bar 96 lifts off the panel and the bubble 143 is formed in the material of the face sheet, the resin in the bubble 143 loses heat. Accordingly, it is important that the panel folding be performed expeditiously following the lifting of the heater bar 96 off the panel so that the resin in the flap 340 is still hot enough to thermoplastically weld to itself when the flap 340 is pressed between the outer face of the anvil and the cellular core of the panel. The factors influencing the rate of heat loss from the face sheet material in the bubble 143, the fold 338 and the flap 340 include the initial temperature to which the material is heated by the heater bar 96, the thermal capacity of the resin and the fiber in the face sheet material, the thermal conductivity of the face sheet material, the mass of resin and fiber in the cross section of the face sheet, the ambient temperature, and the temperature of the anvil 70. Heat loss could also be slowed by the addition of an infrared radiant strip heater (not shown) attached to the sloping front face 106 of the upper platen 38 directed at the panel 65 adjacent the anvil 70.

The bend in the panel, bent in accordance with the process illustrated in FIGS. 19–22, has an "inner radius" on the inside of the bend that is illustrated in FIG. 22 as larger than the very small radius at the corner of the anvil 70 along the tangent line 336. When the folding blade 52 has finished its travel, it forces the panel 65 against the vertical face of the anvil so the shape of the panel at the inside of the bend corresponds very closely with the outer shape of the anvil 70. Depending on the manufacturing process by which the anvil 70 is made, the corner about which the panel 65 is bent can be chamfered, slightly rounded, or sharp.

In all such cases of an anvil for making a 90° bend, the "inner radius" would be small and in the case of the sharp corner, would be very small, perhaps even approaching zero. Nevertheless, the inside of the bend will always have an "inner radius" as defined, even if it is a very small radius.

In the embodiment of FIG. 9, the bubble 143 is formed in the face sheet material immediately adjacent to the anvil 70. In the embodiment of FIG. 10, on the other hand, there is a gap between the tangent line of the anvil 70 ' and the heater bar 96, so the bubble 143 is not formed immediately adjacent the anvil 701. Since the edge of the bubble 143 should be at the tangent line of the anvil, the panel 65 is shifted inward of the machine 30 in the direction of the arrow 342 in FIG. 24 after bubble formation to position the bubble 143 adjacent the anvil prior to bending the panel. The panel 65 is shifted for proper bubble positioning by use of the panel positioning system 86, whose operation will not be repeated here since it was described above, but the sequencing of its operation will be described in conjunction with FIGS. 23–26.

In FIG. 23, the heater bar 96 is shown in contact with the upper face sheet of the panel 65, heating a band of the face sheet to a temperature at which the adhesive holding the face sheet to the cellular core disbonds and the thermoplastic resin in the face sheet softens to thermoplastic welding temperature. During this heating soak cycle, the panel 65 is clamped between the upper platen 38 and the lower platen 36, and the cantilevered distal portion of the panel is supported by the predeflection bar 300 against sagging under its own weight. Typically, the cantilevered distal portion of the panel 65 will be predeflect upward in the range of 0.5°–5.0°, preferably in the range of 1°–2° during this heating phase as illustrated in FIG. 24.

Figure 25:
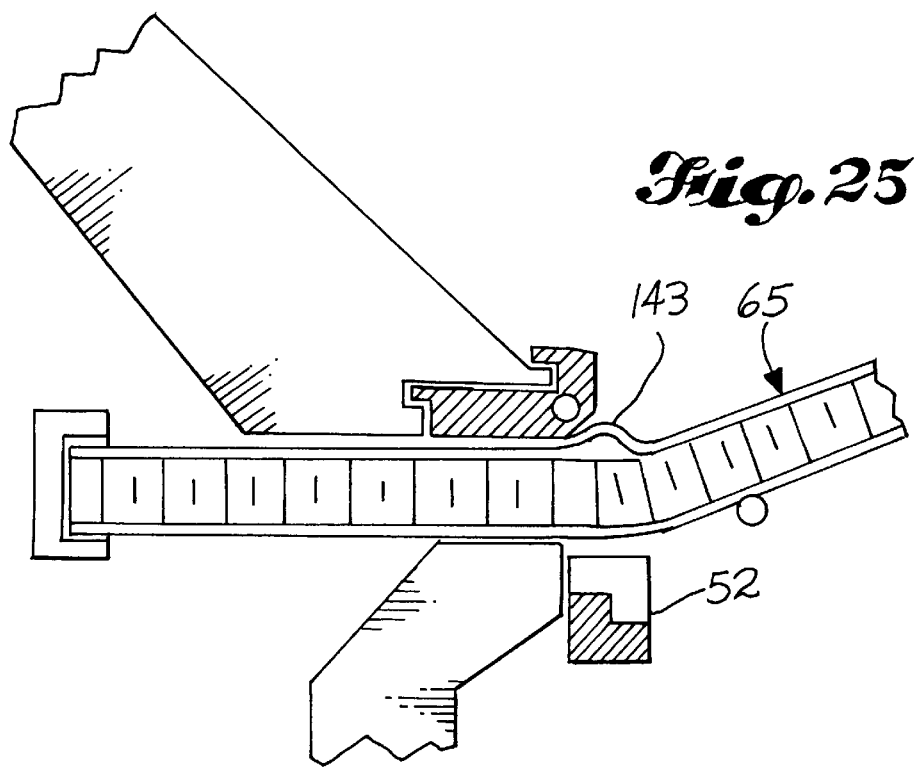

After the heating soak cycle, the heater bar is lifted, forming the bubble 143 as shown in FIG. 24. The lifting of the heater bar and the formation of the bubble is the same as described above in conjunction with FIGS. 19 and 20. In this embodiment of FIGS. 23–26, after formation of the bubble 143, the upper platen 38 is lifted slightly to unclamping the panel 65. The panel positioning system 86 is actuated to shift the panel 65 a predetermined distance back into the machine 30 in the direction indicated by the arrow 342 to position the bubble 143 as illustrated in FIG. 25 adjacent the tangent line of the anvil 70'. When the is panel is positioned with the bubble 143 adjacent the anvil tangent line 336, the upper platen 36 is closed to clamp the panel 65 between the upper and lower platens, as illustrated in FIG. 25. The folding blade 52 is now actuated to rotate through a fold angle $\Theta_f$ of about 45° as illustrated in FIG. 26 to fold the panel 65 upward about the tangent line 336 of the anvil 701. The formation of the fold 338, flattening of the fold 338 into a flap 340, and ironing and thermoplastic welding of the flap 340 are the same as described in conjunction with FIGS. 21 and 22.

The process for forming a bend with an outside radius greater than the thickness of the panel 65 is known as forming a "wrapper". The "wrapper" forming process is illustrated in FIGS. 27 and 28, using the anvil 70" and heater bar 96'illustrated in FIG. 11. The heater bar 96' is similar to the heater bar 96 illustrated in FIGS. 9 and 10 except that it has a wider contact foot used to heat a wider heated band of top face sheet of the panel 65 corresponding to a wider inside radius of the "wrapper". The anvil 70" has a cylindrical outer surface having a radius of curvature $R_i$ equal to the desired inside radius of the wrapper. This process is similar to the process illustrated in FIGS. 23–26 in that the panel is moved after bubble formation to position the bubble adjacent the tangent line of the anvil 70". The primary difference in the wrapper forming process is in the relative position of the lower platen 36 and the folding beam 52. As shown in FIG. 27, the folding beam is adjusted to a position giving it a radius of rotation $R_o$ equal to the outside radius $R_i$ of the anvil 70" plus the thickness t of the panel 65. The lower platen 36 is lowered to a position at which its upper surface is flush with the upper surface of the folding beam.

The region heated by the heater bar 96' corresponds to the surface of the panel around the outside radius of the "wrapper". For most applications requiring high strength of the part, it is desirable to use a panel that has a thermoplastic adhesive for bonding at least the top face sheet of the panel to the cellular core. Use of a thermoplastic adhesive ensures that the area of the face sheet disbanded under the bubble 143 will re-adhere to the cellular core of the panel when it is ironed on by pressure against the cylindrical face of the anvil 70".

The best appearance and strength of the bend is achieved when there is enough extra material to produce a flap with a substantial overlap. Without such overlapping material, the ironing of the bubble material around the surface of the anvil can cause wrinkles and puckers rather than a strong and attractive flap welded down against itself. The best results have been achieved when the linear difference in length, measured in the angular or circumferential direction, between the inside and outside of the wrapper is at least ¼ inch.

Several modifications of the embodiments described above are contemplated. For example, modifications of the heater bar and heater bar mounting hardware, shown in FIGS. 29–31, simplify mounting the heater bar and improve its reliability. The mounting hardware includes a mounting rail 344 extending the full length of the pivoted arm assembly 98, fastened to the end plates 146 by fasteners 148 and leveling jacks 154 for adjusting the position of the mounting rail to ensure that it is straight and level in its lowered position adjacent the lower platen 36. A mounting shoe 346 is fastened to the rail 344 and extends for the full length of the rail. The mounting shoe 346 is identical in structure and operation to the tool holder 62 for mounting the anvils, as shown in FIGS. 5 and 9–11.

A heater bar 350 is supported on two posts 348, each attached by fasteners to a foot 352 which fits into and is supported by the shoes 346 in the same manner that the tool base member 69 fits into an is supported by the tool holder 62. A detent 354 holds each foot 352 in place until an air hose can be pressurized to force plates in a recess against the upper surface of the foot 352 to jam the foot in its shoe 346, as described for the tool holder 62 and the tool base member 69 above. A connector bar 356 extends between the posts 348 and is fastened thereto by fasteners 358 to rigidify the heater bar assembly.

A square notch 360 opening rearwardly and downwardly in the posts 348 receives the heater bar 350 and a sheet metal shroud 362 which minimizes heat loss by convection from the heater bar 350. The back piece of the shroud 362 is extended vertically and fastened to the back side of the posts 348, and is also bent into a rearwardly projecting flange 364 which is fastened to and supports a sheet metal roof 366. The roof extends over the shroud 362 to retard heat loss from the shroud 362 and primarily to cover the shroud against accidental contact with the shroud 362 by workers in the vicinity.

A shoulder bolt 368 is threaded into a hole in each post 348 and extend through a slotted hole in the upper portion of the heater bar 350 to support the heater bar 350 on the posts 348. The height of the slotted hole in the heater bar 350 is larger than the diameter of the shoulder bolt 368, allowing the heater bar 350 to self adjust and lie flat against the panel face sheet when the heater bar is lowered into the heating position. Two ceramic bushings 370 are slid onto the shoulder bolt 368, bracketing the heater bar 350 to center the heater bar within the shroud 362.

Obviously, numerous other modifications and variations of the described preferred embodiment are possible and will occur to those skilled in the art in light of this disclosure.

Accordingly, it is expressly to be understood that these modifications and variations, and the equivalents thereof, shall be considered to be within the scope of the invention as defined in the following claims, wherein we claim:

1. A process for bending a thermoplastic skinned honeycomb core panel, comprising:

clamping a planar portion of said panel to hold said planar portion against movement parallel to the plane of said planar portion;

heating a linear band of an inside face sheet on one side of said panel to soften resin in said inside face sheet and disbond adhesive holding said inside face sheet to said honeycomb core;

forming said linear band into a bubble separated away from said honeycomb core;

bending a distal leg of said panel, outboard of said clamped portion, around a heated anvil along an axis parallel to said linear band to form a bend having an inside radius, with said bubble coinciding with said inside radius;

collapsing said bubble around said inside radius and forming an overlapping flap of inside face sheet;

pressing said overlapping flap of inside face sheet in a fold between said anvil and a bent leg of said panel, and holding said leg in said bent position while resin in said flap solidifies in said fold.

2. A process for bending a thrmoplastic skinned honeycomb core panel as defined in claim 1, wherein:

said collapsing step includes ironing said flap against said leg with said anvil to form said fold; and bonding said fold to said inside face sheet outboard of said bend.

3. A process for bending a thrmoplastic skinned honeycomb core panel as defined in claim 1, wherein:

said collapsing step includes rolling said bubble along said anvil from said axis toward a far edge of said linear band and folding said bubble over said far edge against said inside face sheet.

4. A process for bending a thermoplastic skinned honeycomb core panel as defined in claim 3, further comprising:

heating said anvil to a temperature high enough to retard heat loss from said resin in said flap while said flap is in contact with said anvil, and to a temperature less than the softening temperature of said resin; and holding said flap against said inside skin with said anvil while said resin solidifies;

whereby said heated anvil retards heat loss from said bubble during said rolling and folding steps while permitting said resin to solidify and bond while held against said inside skin.

5. A process for bending a thrmoplastic skinned honeycomb core panel as defined in claim 4, further comprising:

maintaining said anvil temperature within a range of about 200–400° F.

6. A process for bent a thermoplastic skinned honeycomb core panel as defined in claim 4, further comprising:

holding said panel in said bent shape for long enough for said resin to solidify in said ironed position.

7. A process for bending a thrmoplastic skinned honeycomb core panel as defined in claim 1, further comprising:

shifting said panel, immediately after forming said bubble, to position said bubble adjacent to said heated anvil.

8. A process for bending a thrmoplastic skinned honeycomb core panel as defined in claim 1, further comprising:

flexing said panel into a slight bend about said anvil during said heating and forming steps to facilitate formation of said bubble.

9. A process for bending a thrmoplastic skinned honeycomb core panel as defined in claim 1, wherein:

said heating step includes pressing a heated heater bar against said linear band of said face sheet for sufficient time to raise the temperature in said linear band to a temperatureat which said resin softens and said adhesive disbonds; and said forming step includes adhering said linear band of said inside face sheet to said heater bar and pulling said heater bar away from said core.

10. A process for bending a thrmoplastic skinned honeycomb core panel as defined in claim 9, wherein:

said heater bar is heated to a temperature of about 600° F. during said heating step.

11. A process for bending a thermoplastic skinned cellular core panel, comprising:

clamping a planar portion of said panel to hold said planar portion immobile;

heating a linear band of an inside face sheet on one side of said panel to soften resin in said inside face sheet and disbond adhesive holding said inside face sheet to said cellular core;

forming said linear band into a bubble separated away from said cellular core;

bending a distal leg of said panel, outboard of said clamped portion, around a heated anvil along an axis parallel to said linear band to form a bend having an inside radius, with said bubble coinciding with said inside radius;

collapsing said bubble around said inside radius and ironing said flap against said leg with said anvil to form an overlapping flap of inside face sheet;

pressing said overlapping flap of inside face sheet between said anvil and said bent distal leg of said panel, and holding said leg in said bent position while resin in said flap solidifies and bonds to said inside face sheet outboard of said bend.

12. A process for bending a thermoplastic skinned cellular core panel as defined in claim 11, wherein:

said anvil has an outer surface with a curved portion shaped to correspond to a desired smooth continuous inner radius of said panel to be formed in a wrapper, said anvil having first and second tangent portions tangent to opposite angular sides of said curved portion, said first and second tangent portions extending tangent to angular extremities of said curved portion and horizontally off-set from each other.

13. A process for bending a thermoplastic skinned cellular core panel as defined in claim 12, wherein:

said collapsing step includes rolling said bubble along said curved portion of said anvil from one of said tangent portions toward the opposite tangent portions on the other side of said curved portion, and folding said bubble over said far edge against said inside face sheet.

14. A process for bending a thermoplastic skinned cellular core panel as defined in clan 12, further comprising:

rebonding said inside face sheet to said cellular core while said resin in said flap solidifies and bonds to said inside face sheet outboard of said bend.

15. A process for bending a thermoplastic skinned cellular core panel as defined in claim 14, wherein:

said disbonding step includes heating a thermoplastic adhesive holding said inside skin to said cellular core to a temperature at which said thermoplastic adhesive softens and loses bonding strength, and said rebonding step includes pressing said inside face sheet against said cellular core and holding said face sheet in contact with said-cellular core while said thermoplastic adhesive cools and reacquires adhesive strength to hold said inside sheet to said cellular core.

16. A process for bending a sandwich panel having a thermoplastic face sheet bonded onto each side of a honeycomb core, comprising:

clamping a first portion of said panel to a base of an apparatus to hold said first portion fixed to said base;

heating a linear band of an inside face sheet on one side of said panel to soften said linear band and disbond adhesive holding said linear band to said honeycomb core;

detaching said linear band from said honeycomb core as a bubble separated away from said honeycomb core;

bending a second portion of said panel, outboard of said first portion, around an anvil along an axis parallel to said linear band to form a bend having an inside radius, with said bubble coinciding with said inside radius;

collapsing said bubble around said inside radius and ironing said flap with said anvil against said second portion to form an overlapping flap of inside face sheet;

pressing said overlapping flap of inside face sheet between said anvil and said bent second portion of said panel, and holding said panel in said bent position while said flap hardens and bonds to said inside face sheet outboard of said bend.

17. A process for bending a sandwich panel as defined in claim 16, wherein:

said collapsing and ironing steps include rolling said bubble along said anvil from one edge of said bubble closest to said first portion of said panel toward a far edge of said bubble remote from said first portion of said panel, and folding said bubble over said far edge against an exterior surface of said inside face sheet.

18. A process for bending a sandwich panel as defined in claim 16, further comprising:

shifting said panel to position said bubble adjacent to said anvil.

19. A process for bending a sandwich panel as defined in claim 16, further comprising:

flexing said panel about said anvil during said detaching step to put said inside face sheet in a slight state of compression and facilitate formation of said bubble.

20. A process for bending a sandwich panel made of a composite face sheet, having reinforcing fibers in a thermoplastic resin matrix, bonded onto each side of a cellular core, comprising:

heating a linear band of an inside face sheet on one side of said panel to soften said linear band and disbond adhesive holding said linear band to a bend portion of said cellular core;

detaching said linear band from said cellular core as a bubble separated away from said cellular core;

bending an outboard portion of said panel, outboard of an inboard portion, around an anvil along an axis parallel to said linear band while holding said inboard portion of said panel immobile with respect to said anvil to form a bend having an inside radius, with said bubble coinciding with said inside radius;

collapsing said bubble around said inside radius and ironing said flap with said anvil against said bend portion of said cellular core to form an overlapping fold of inside face sheet;

pressing said overlapping fold of inside face sheet between said anvil and said bent portion of said panel, and holding said panel in said bent position while said resin in said fold cools and bonds to said inside face sheet adjacent to outboard regions of said bend.

21. A process for bending a sandwich panel as defined in claim 20, further comprising:

shifting said panel, immediately after forming said bubble, to position said bubble more closely adjacent to said heated anvil.

22. A process for bending a sandwich panel as defined in claim 20, wherein:

said collapsing and ironing steps include rolling said bubble along said anvil from one edge of said bubble closest to said inboard portion of said panel toward a far edge of said bubble remote from said inboard portion of said panel, and folding said bubble over said far edge against an exterior surface of said inside face sheet.

23. A process for bending a sandwich panel as defined in claim 20, further comprising:

shifting said panel to position said bubble adjacent to said anvil.

24. A process for bending a sandwich panel as defined in claim 23, wherein said panel shifting step includes:

gripping said panel with a suction gripper of a panel translation device and shifting said after formation of said bubble to move said bubble to a position closely adjacent to said anvil before forming said bend in said panel.

25. A process for bending a sandwich panel as defined in claim 20, further comprising:

flexing said panel about said anvil during said detaching step to put said inside face sheet in a slight state of compression to facilitate formation of said bubble.

26. A process for bending a sandwich panel as defined in claim 24, wherein:

said flexing step includes moving a bar, disposed adjacent said panel on a side thereof opposite said anvil, a selected displacement into engagement with said panel to flex said outboard leg of said panel and bend said panel slightly about said anvil.

27. A process for bending a sandwich panel as defined in claim 20, wherein:

said fold thermoplastically welds to said face sheet while said overlapping fold of inside face sheet is pressed between said anvil and said bent portion of said panel.

28. A process for bending a sandwich panel as defined in claim 24, wherein:

said heating step includes contacting said linear band of said inside face sheet with a heated heater bar, and said detaching step includes adhering said heated linear band of inside face sheet to said heater bar and pulling said heater bar away from said inside face sheet to pull said linear band away from said core to form said bubble.

29. A process for bending a thermoplastic skinned honeycomb core panel, comprising:

clamping an inboard leg of a panel in a first position, with an outboard leg of said panel extending beyond said clamped inboard leg;

controlling power to a heater to raise the temperature of said heater at least to a resin disbanding temperature at which a first thermoplastic skin can separate from said core;

moving said heater into close juxtaposition with said panel in said first position and heating a band of said first thermoplastic skin on one side of said panel;

separating said heated band of thermoplastic skin from said core to create a bubble;

establishing contact between an anvil and said panel outboard of said clamped inboard leg; and bending said outboard leg of said panel around said anvil;

whereby said band of said first thermoplastic skin is heated to said disbanding temperature by said heater and lifts away from said core to form said bubble, and said outboard leg of said panel is bent around said anvil, ironing said bubble into a flap against said anvil and pressing said flap on a smooth and attractive overlapping fold against said panel and welding said fold against said first thermoplastic skin to create a strong corner bend.

30. A process for bending a thermoplastic skinned honeycomb core panel as defined in claim 29, further comprising:

holding said outboard leg of said panel in said bent position around said anvil until said resin in said fold freezes to form said weld with said first thermoplastic skin.

31. A process for bending a thermoplastic skinned honeycomb core panel as defined in claim 29, wherein:

said heater is a heater bar, and said heating of said band of said first thermoplastic skin includes contacting said thermoplastic skin with said heater bar.

32. A process for bending a thermoplastic skinned honeycomb core panel as defined in claim 31, further comprising:

said separating step includes sticking said heated band of said first thermoplastic skin to said heater bar and moving said heater bar to pull said heated band away from said core to create said bubble.

33. A process for bending a thermoplastic skinned honeycomb core panel as defined in claim 29, further comprising:

raising said anvil temperature to a temperature below which thermoplastic material in said first thermoplastic skin softens to retard premature quenching of said resin when said bubble is ironed into a flap against said anvil and before said flap is pressed against said panel for welding thereto.

34. A process for bending a thermoplastic skinned honeycomb core panel as defined in claim 29, wherein:

said step of establishing contact between said anvil and said panel occurs simultaneously with said clamping step.

35. A process for bending a thermoplastic skinned honeycomb core panel as defined in claim 31, further comprising:

unclamping said panel after said heating step and moving said panel to a second position closer to said anvil.

36. A process for bending a thermoplastic skinned honeycomb core panel as defined in claim 31, further comprising:

flexing said panel to put said first skin in compression to facilitate said separation of said first skin from said core to form said bubble.

37. A process for bending a thermoplastic skinned honeycomb core panel as defined in claim 31, wherein:

said flexing step includes bending said outboard leg several degrees about said anvil.

38. A process for bending a thermoplastic skinned honeycomb core panel as defined in claim 31, further comprising:

energizing electrical heaters with electrical power to heat said heater bar and said anvil to desired temperatures.

39. A process for bending a thermoplastic skinned honeycomb core panel as defined in claim 31, wherein:

said ironing of said bubble into a flap against said anvil includes rolling said bubble along said anvil from one edge of said bubble closest to said inboard portion of said panel toward a far edge of said bubble remote from said inboard portion of said panel, and folding said bubble over said far edge against an exterior surface of said inside face sheet.

\* \* \* \* \*